(12) United States Patent
Umayabashi et al.

(10) Patent No.: US 9,300,558 B2
(45) Date of Patent: Mar. 29, 2016

(54) DELAY MEASUREMENT SYSTEM AND DELAY MEASUREMENT METHOD, AS WELL AS DELAY MEASUREMENT DEVICE AND DELAY MEASUREMENT PROGRAM

(75) Inventors: Masaki Umayabashi, Tokyo (JP); Zhenlong Cui, Tokyo (JP); Kazuo Takagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 435 days.

(21) Appl. No.: 13/823,534

(22) PCT Filed: Sep. 21, 2011

(86) PCT No.: PCT/JP2011/071473
§ 371 (c)(1),
(2), (4) Date: Mar. 14, 2013

(87) PCT Pub. No.: WO2012/046574
PCT Pub. Date: Apr. 12, 2012

(65) Prior Publication Data
US 2013/0170390 A1  Jul. 4, 2013

(30) Foreign Application Priority Data
Oct. 4, 2010 (JP) ................................. 2010-224842

(51) Int. Cl.
*H04L 12/70* (2013.01)
*H04L 12/26* (2006.01)
(Continued)

(52) U.S. Cl.
CPC ............ *H04L 43/0852* (2013.01); *H04L 47/32* (2013.01); *H04L 47/28* (2013.01)

(58) Field of Classification Search
None
See application file for complete search history.

(56) References Cited

U.S. PATENT DOCUMENTS 5,793,976 A * 8/1998 Chen et al. ..................... 709/224
6,907,006 B1 * 6/2005 Sakamoto et al. ......... 370/236.2
(Continued)

FOREIGN PATENT DOCUMENTS

CN  1665204 A  9/2005
JP  2189046 A  7/1990
(Continued)

OTHER PUBLICATIONS

Office Action dated Nov. 8, 2013 issued by the Japanese Patent Office in counterpart Japanese Application No. 2012537634.
Akihiko Machizawa, et al., "Development of a Cascadable Passing Through Precision UDP Time-Stamping Device", The Transactions of the Institute of Electronics, Information and Communication Engineers, Oct. 1, 2005, pp. 2002-2011, vol. J88-B, No. 10.
(Continued)

*Primary Examiner* — Alex Skripnikov
(74) *Attorney, Agent, or Firm* — Sughrue Mion, PLLC

(57) ABSTRACT

The present invention measures 1-way delay without equipping all nodes with special functionality in a situation in which time has not been synchronized. The delay measurement system of the present invention has a transmission origin node and a transmission destination node which is connected to the transmission origin node through a network including relay nodes, and measures the delay time from the transmission origin node to the transmission destination node direction, wherein the transmission origin node generates a clock. On the basis of the generated clock, delay measurement packets are generated at regular periods. The generated delay measurement packets are transmitted to the transmission destination node. The transmission destination node selects the delay measurement packets from among the received frames. The delay received by the delay measurement packets in the network between the transmission origin node to the node itself is measured.

14 Claims, 18 Drawing Sheets

(51) Int. Cl.
*H04L 12/823* (2013.01)
*H04L 12/841* (2013.01)

(56) References Cited

U.S. PATENT DOCUMENTS

| | | |
|---|---|---|
| 2004/0105391 A1 | 6/2004 | Charcranoon |
| 2004/0196840 A1 | 10/2004 | Amrutur et al. |

FOREIGN PATENT DOCUMENTS

| | | |
|---|---|---|
| JP | 9-321795 A | 12/1997 |
| JP | 2002101097 A | 4/2002 |
| JP | 2004-007339 A | 1/2004 |
| JP | 2004-289791 A | 10/2004 |
| JP | 2004-312734 A | 11/2004 |
| JP | 2010-093702 A | 4/2010 |
| WO | 2008126210 A1 | 10/2008 |

OTHER PUBLICATIONS

ITU-T Recommendation Y.1731—OAM Functions and Mechansims for Ethernet Based Networks (3 LC comments received), Jun. 27, 2006, p. 1.

M. Vigoureux et al., "Requirements for OAM in MPLS Transport Networks draft-vigoureux-mpls-tp-oam requirements-00", The IETF Trust, Jul. 7, 2008, p. 1.

Kuiwen Ji, "IEEE1588V2 Telecom Profile Framework draft-ji-tictoc-1588-telecom-profile-framework-00.txt", Feb. 2008, p. 1.

I Busi et al., "MPLS-TP OAM Framework and Overview draft-busi-mpls-tp-oam-framework-00", The IETF Trust. Oct. 27, 2008, p. 1.

Communication dated Jan. 12, 2015, issued by the State Intellectual Property Office of the People's Republic of China in corresponding application No. 201180048308.8.

\* cited by examiner

DELAY MEASUREMENT SYSTEM AND DELAY MEASUREMENT METHOD, AS WELL AS DELAY MEASUREMENT DEVICE AND DELAY MEASUREMENT PROGRAM

CROSS REFERENCE TO RELATED APPLICATIONS

This application is a National Stage of International Application No. PCT/JP2011/071473 filed on Sep. 21, 2011, which claims priority from Japanese Patent Application No. 2010-224842, filed on Oct. 4, 2010, the contents of all of which are incorporated herein by reference in their entirety.

TECHNICAL FIELD

The present invention relates to end-to-end or zone-by-zone measurement of delay added when a packet forwarded in a network passes through a relay unit.

BACKGROUND ART

Along with recent adoption of IP/Ethernet® technology in user traffic, packetization of a carrier network is underway in order to efficiently accommodate packet traffic. A SONET/SDH-based network has used a carrier-class fine monitoring/control (OAM: Operations, Administration and Maintenance) function to respond to a carrier-grade service request. The SONET/SDH is a general term for SONET (Synchronous Optical NETwork) and SDH (Synchronous Digital Hierarchy). Hereinafter, "network" is often referred to as "NW".

Under a circumstance where a SONET/SDH carrier NW is shifted to a packet NW, the packet NW is required to realize an equivalent level of the OAM function to that of the carrier NW, and vigorous discussion is underway toward standardization.

For example, the OAM for Ethernet® is recommended in ITU-T (International Telecommunication Union Telecommunication Standardization Sector) Y. 1731. Further, also for a MPLS-TP currently attracting attention as a MPLS-based packet transport technology, the OAM function is on the way to standardization as one of striking functions in IETF.

The OAM function is classified into a Fault Management function that performs detection, notification, and localization of a fault and a Performance Monitor function (hereinafter, referred to as "PM function") that monitors performance of data traffic.

The PM function typically includes a Delay Measurement function (hereinafter, referred to as "DM function"), a Loss Measurement function (hereinafter, referred to as "LM function").

The above DM function includes a 1-way DM function that measures a one-way delay time between a transmission source node to a transmission destination node and a 2-way DM function that measures a round-trip delay time between the transmission source node to transmission destination node.

In the 1-way DM function, the transmission source node stores a transmission time in a delay measurement OAM packet (hereinafter, referred to as "DM packet") on the assumption that the source and transmission destination nodes are time-synchronized with each other. Then, the transmission destination node calculates a delay time from a difference between a reception time and the transmission time stored in the DM packet. As a related art, a technique disclosed in PTL 1 can be cited. In the technique disclosed in PTL 1, a quality measurement device 3A transmits a measurement packet intermittently at regular intervals, and a quality measurement device 3B receives the measurement packet. Thereafter, a management device 2 calculates communication quality of the measurement packet based on a transmission/reception state with respect to the measurement packet transmitted/received by both the quality measurement devices 3A and 3B.

In the 2-way DM function, a delay time is calculated from a difference between a transmission time of the DM packet (Request) in the transmission source node and a reception time of the DM packet (Reply) sent back from the transmission destination node.

As described above, the time synchronization between the both nodes is not required in the 2-way DM function, whereas the 1-way DM function assumes that the both nodes are time-synchronized with each other. For example, also in the technique disclosed in PTL 1, the time synchronization is required at least between the quality measurement devices 3A and 3B since the measurement delay time is measured from the transmission/reception time of the measurement packet.

However, in a packet network, there may be a case where the time synchronization is difficult to achieve between the nodes. Therefore, the 1-way DM function is required to be able to measure the delay time even in the absence of the time synchronization.

As a method that uses a normal function to measure a 1-way delay even in the absence of time synchronization, there is known a method that utilizes an extended function of IEEE 1588 time synchronization technology.

In IEEE 1588, a Transparent Clock function (hereinafter, referred to as "TC function") is defined as an extended function of version 2 (hereinafter, IEEE 1588 utilizing the TC function is referred to as "IEEE 1588 v2 w/TC").

In IEEE 1588 v2 w/TC, each relay node has the TC function that measures a sojourn time of a control packet (packet of IEEE 1588 message) in a node and writes the measured sojourn time in a predetermined field of the control packet for cumulative addition of the sojourn time. With this TC function, in IEEE 1588 v2 w/TC, the sojourn time in the relay node is added to the message every time the control packet passes through the relay node. This allows the transmission destination node to accurately grasp a sum of queuing delays generated in the respective relay nodes when the control packet is forwarded from the transmission source node. The delay includes a fixed delay (propagation delay) and a variable delay such as the above-mentioned queuing delay. The fixed delay that has once been measured between nodes is not changed unless there is a route change. Thus, in the following description, the variable delay for each packet is measured. Note that the fixed delay can be calculated in a management system based on a physical connection state of the nodes and a path setting state or calculated by measuring a round-trip delay for a priority class with forward and backward routes set as a single physical route and by halving the measured value.

CITATION LIST

Patent Literature

{PTL 1} JP-A-2004-007339

Non-Patent Literature

{NPL 1} ITU-T Y.1731 [online], [searched Oct. 1, 2010], Internet <URL: http://www.itu.int/itudoc/itu-t/aap/sg13aap/recaap/y1731/>

{NPL 2} IETF draft-ietf-mpls-tp-oam-requirements [online], [searched Oct. 1, 2010], Internet <URL: http://tools.ietf.org/html/draft-vigoureux-mpls-tp-oam-requirements-00>

{NPL 3} IETF draft-ietf-mpls-tp-oam-framework [online], [searched Oct. 1, 2010], Internet <URL: http://tools.ietf.org/html/draft-busi-mpls-tp-oam-framework-00>

{NPL 4} IEEE 1588 V2 telecom profile framework [online], [searched Oct. 1, 2010], Internet <URL: http://tools.ietf.org/html/draft-ji-tictoc-1588-telecom-profile-framework-00>

SUMMARY OF INVENTION

Technical Problem

As described above, the use of the TC function of IEEE 1588 v2 allows the 1-way delay time to be measured even in the absence of the time synchronization between the source/transmission and destination nodes.

However, in the method using IEEE 1588 v2 w/TC, it is necessary for all the relay nodes in a NW to have the TC function in order to measure the delay time accurately.

This point will be described with reference to FIGS. 17 and 18. In FIGS. 17 and 18, in a network in which a transmission source node 1000 and a transmission destination node 1003 are connected to each other through relay nodes 1001 and 1002, a 1-way delay of a DM packet to be transmitted from the transmission source node 1000 to the transmission destination node 1003 is measured. All the nodes 1000 to 1003 have the TC function in the example of FIG. 17, whereas only the node 1001 has the TC function in the example of FIG. 18. The delay time in the nodes 1000 to 1003 are assumed to be D0=1 ms/D1=1 ms/D2=2 ms/D3=0 ms.

Under such conditions, in the case of the example of FIG. 17 in which all the nodes have the TC function, intra-node delay time are added by the TC functions of the respective nodes. As a result, the transmission destination node 1003 can accurately measure a delay time of 4 ms (1 ms+1 ms+2 ms). On the other hand, in the case of the example of FIG. 18 in which not all the nodes have the TC function, the intra-node delay time of the node 1001 that does not have the TC function is not added. As a result, a delay time of 3 ms (1 ms+2 ms) is measured in the transmission destination node 1003. That is, the delay time of 1 ms in the relay node 1001 is not measured and, as a result, the delay time is not measured correctly.

As described above, the method using IEEE 1588 v2 w/TC cannot accurately measure the delay time unless all the relay nodes in the NW have the TC function. Under the current circumstances, the TC function is not implemented in almost every nodes, and it is very difficult and impractical for the TC function to be implemented in all the relay nodes.

An object of the present invention is therefore to provide a delay measurement system, a delay measurement method, a delay measurement device, and a delay measurement program capable of measuring the 1-way delay without adding a special function to all nodes even in the absence of time synchronization.

Further, a normal 1-way DM function can only measure an end-to-end delay between the source and transmission destination nodes. In addition to this function, if a delay between an arbitrary pair of nodes located between the transmission source and destination nodes can be measured, finer performance measurement can be achieved. Thus, another object of the present invention is to provide a delay measurement system, a delay measurement method, a delay measurement device, and a delay measurement program capable of performing zone-by-zone delay measurement without adding a special function to all nodes even in the absence of time synchronization.

Solution to Problem

According to a first aspect of the present invention, there is provided a delay measurement system that includes a transmission source node and a transmission destination node connected to the transmission source node over a network including a relay node, and measures a delay time in a direction from the transmission source node to the transmission destination node, wherein the transmission source node comprises: a source clock generation section that generates a clock; a control packet generation section that generates a delay measurement packet at a regular interval based on the clock generated by the source clock generation section; and a control packet transmission section that transmits the generated delay measurement packet to the transmission destination node, and the transmission destination node comprises: a control packet analysis section that selects the delay measurement packet from a reception frame; and a delay measurement section that measures a delay of the delay measurement packet transmitted from the transmission source node to its host node in the network.

According to a second aspect of the present invention, there is provided a delay measurement system that measures a delay time on a network including a transmission source node, a transmission destination node connected to the transmission source node through relay nodes; and the relay nodes that relay communication from the transmission source node to the transmission destination node, the transmission source node including: a source clock generation section that generates a clock; a control packet generation section that generates a delay measurement packet at a regular interval based on the clock generated by the source clock generation section; and a control packet transmission section that transmits the generated delay measurement packet to the transmission destination node, the relay nodes each including: a control packet analysis section that selects the delay measurement packet from a reception frame; a delay calculation section that calculates a delay time of the delay measurement packet transmitted from the transmission source node to its host node in the network; a control packet correction section that stores the calculated delay time and a node identifier of its host node in the delay measurement packet to correct the delay measurement packet; and a control packet transmission section that transmits the delay measurement packet corrected by the correction section toward the transmission destination node, the transmission destination node including: a control packet analysis section that selects the delay measurement packet from a reception frame; and a delay measurement section that measures a delay of the delay measurement packet transmitted from the transmission source node to its host node in the network, the transmission destination node calculating, based on the delay time and node identifier stored in the delay measurement packet, any one or a combination of the delay time between the transmission source node and transmission destination node, delay time between the transmission source node and relay node, delay time between the relay nodes, and delay time between the relay node and transmission destination node.

According to a third aspect of the present invention, there is provided a delay measurement device that serves as a transmission destination node connected to a transmission source node over a network including a relay node and measures a delay time between the transmission source node and the transmission destination node, including: an interface that receives a delay measurement packet generated at a regular interval based on a source clock generated by the transmission source node; a control packet analysis section that selects the delay measurement packet from a reception frame; and a delay measurement section that measures a delay of the delay measurement packet transmitted over the network from the transmission source node to its host node.

According to a fourth aspect of the present invention, there is provided a delay measurement method that a system including a transmission source node and a transmission destination node connected to the transmission source node over a network including a relay node performs to measure a delay time in a direction from the transmission source node to the transmission destination node, including steps of: generating a clock by the transmission source node; generating a delay measurement packet by the transmission source node at a regular interval based on the generated clock; transmitting the generated delay measurement packet to the transmission destination node by the transmission source node; selecting the delay measurement packet from a reception frame by the transmission destination node; and measuring a delay of the delay measurement packet transmitted from the transmission source node to its host node in the network by the transmission destination node.

According to a fifth embodiment of the present invention, there is provided a delay measurement method performed by a system that includes a network including a transmission source node, a transmission destination node connected to the transmission source node through relay nodes, and the relay nodes that relay communication from the transmission source node to the transmission destination node, including steps of: generating a clock by the transmission source node; generating a delay measurement packet by the transmission source node at a regular interval based on the generated clock; transmitting the generated delay measurement packet to the transmission destination node by the transmission source node; selecting the delay measurement packet from a reception frame by each of the relay nodes; calculating a delay time of the delay measurement packet transmitted from the transmission source node to its host node in the network by each of the relay nodes; storing the calculated delay time and a node identifier of its host node in the delay measurement packet by each of the relay nodes to correct the delay measurement packet; transmitting the corrected delay measurement packet toward the transmission destination node by each of the relay nodes; selecting the delay measurement packet from a reception frame by the transmission destination node; measuring a delay of the delay measurement packet transmitted from the transmission source node to its host node in the network by the transmission destination node; and calculating, based on the delay time and node identifier stored in the delay measurement packet, any one or a combination of the delay time between the transmission source node and transmission destination node, delay time between the transmission source node and relay node, delay time between the relay nodes, and delay time between the relay node and transmission destination node by the transmission destination node.

According to a sixth aspect of the present invention, there is provided a delay measurement program that is installed in a transmission destination node connected to a transmission source node over a network including a relay node and measures a delay time between the transmission source node and the transmission destination node, allowing a computer to function as: an interface that receives a delay measurement packet generated at a regular interval based on a source clock generated by the transmission source node; a control packet analysis section that selects the delay measurement packet from a reception frame; and a delay measurement section that measures a delay of the delay measurement packet transmitted over the network from the transmission source node to its host node.

Advantageous Effects of Invention

According to an exemplary advantage of the present invention, a delay measurement function is implemented in the transmission destination node to measure the end-to-end one-way delay, so that it is possible to measure the 1-way delay without adding a special function to all nodes even in the absence of time synchronization.

Further, according to an exemplary advantage of the present invention, the delay measurement function is implemented only in the measurement node, so that its is possible to perform zone-by-zone measurement without adding a special function to all nodes even in the absence of time synchronization.

Figure 1:
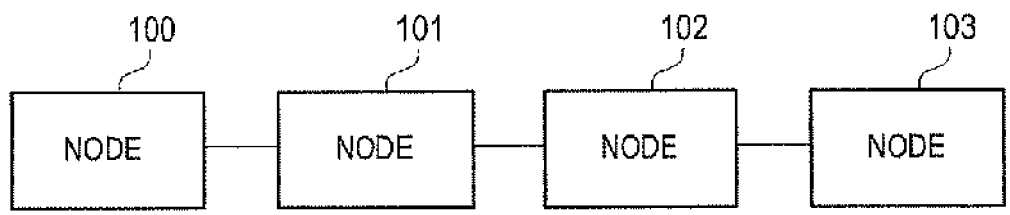
FIG. 1 A block diagram illustrating a basic configuration of the entire system in exemplary embodiments of the present invention.

REFERENCE SIGNS LIST 100, 101, 102, 103: Node according to exemplary embodiments of present invention
110: Memory
120: CPU
130: Console I/O
140: Packet switching section
141: Packet analysis section
142: OAM control section
143: Packet forwarding section
144, 230: Forwarding table
145: Buffer group
153, 163, 173, 183: IF
152, 162, 172, 182: PHY
151, 161, 171, 181: MAC
210: OAM packet generation section
220: Clock section
240: OAM packet transmission section
250: OAM packet analysis section
260, 310: Delay measurement section
261: Delay calculation section
262: Counter maximum value monitor section
263: On-arrival counter value monitor section
264: Packet counter
270: OAM processing section
280, 330: OAM packet termination section
320: OAM packet correction section
1000, 1001, 1002, 1003: Conventional node

DESCRIPTION OF EMBODIMENTS

Exemplary embodiments of the present invention will be described in detail below with reference to the accompanying drawings.

First Exemplary Embodiment

An outline of a first exemplary embodiment of the present invention will first be described. The present exemplary embodiment does not adopt a configuration like IEEE 1588 v2 w/TC, in which a special function is added to each node of the relay network to measure the intra-node sojourn delay to thereby obtain the end-to-end delay time, but adopts a configuration in which a delay measurement function is added to the transmission destination node to thereby measure an end-to-end one-way delay. Thus, unlike IEEE 1588 v2 w/TC, it is possible to achieve the one-way delay time measurement without making an impact on the relay network. Thus, existing relay network nodes can be utilized without change, facilitating introduction of this system and increasing feasibility thereof. This is the outline of the present exemplary embodiment.

<Configuration>

The entire configuration of the present exemplary embodiment will be described with reference to FIG. 1. Referring to FIG. 1, the present exemplary embodiment includes nodes 100, 101, 102, and 103. The node 100 serving as a transmission source node and the node 103 serving as a transmission destination node are connected to each other through the relay nodes 101 and 102.

The example of FIG. 1 includes four nodes; however, this is merely illustrative. The present exemplary embodiment may be applied to a network including an arbitrary number of nodes.

Figure 2:
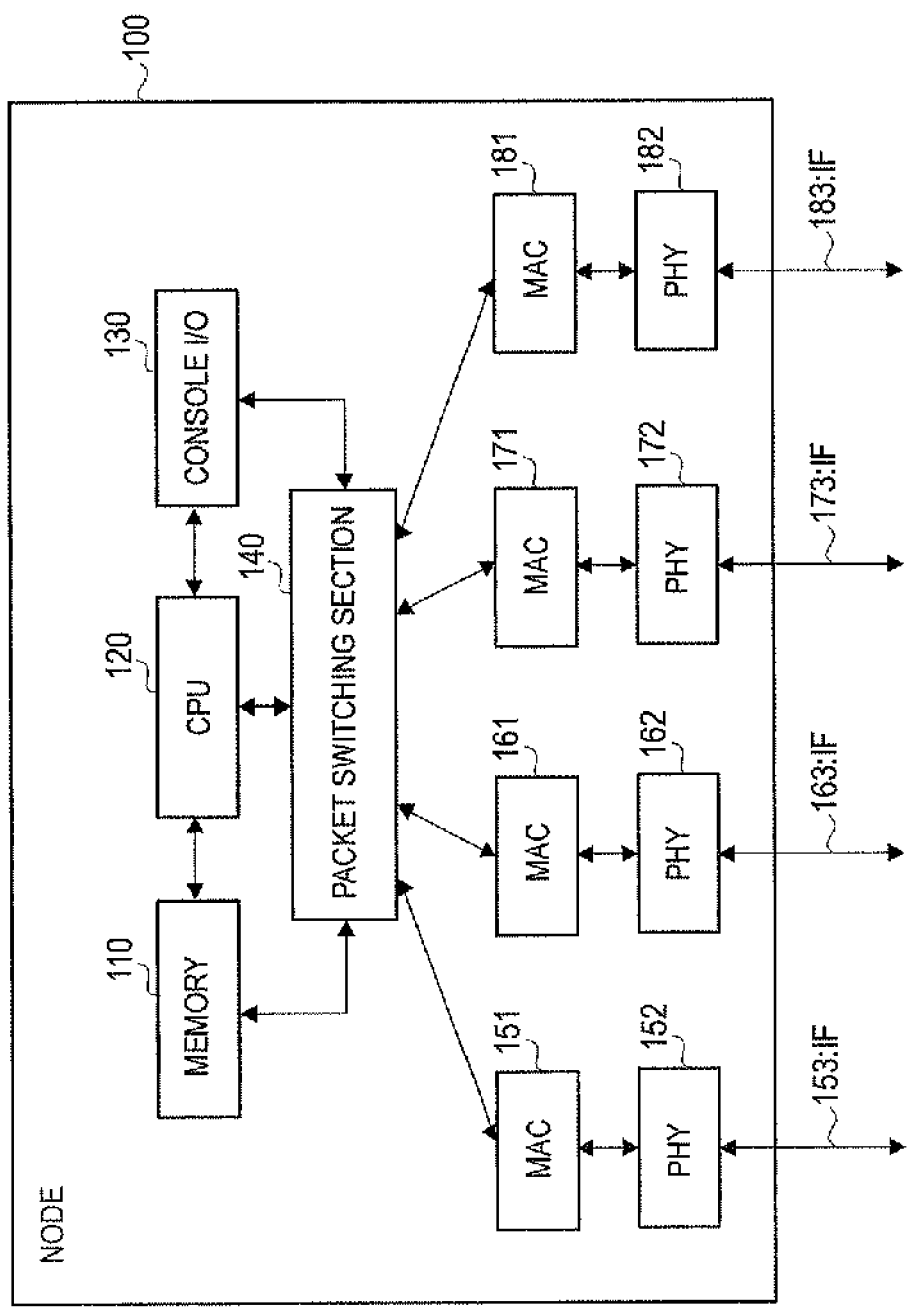
FIG. 2 A block diagram illustrating a basic configuration of a node in the exemplary embodiments of the present invention.

A configuration of each node in the present exemplary embodiment will be described with reference to FIG. 2. Although a description is made taking, as an example, the node 100, other nodes (nodes 101 to 103) each have the same configuration as that of the node 100.

The node 100 includes a PHY 152, a PHY 162, a PHY 172, a PHY 182, a MAC 151, a MAC 161, a MAC 171, a MAC 181, a packet switching section 140, a memory 110, a CPU 120, and a console I/O 130.

An IF 153, an IF 163, an IF 173, and an IF 183 are connected with the PHYs 152, 162, 172, and 182, respectively. The PHYs 162, 172, and 182 are connected with the MACs 151, 161, 171, and 181, respectively. The MACs 151, 161, 171, and 181 are connected with the packet switching section 140. In FIG. 2, four sets of the MAC, PHY, and IF are illustrated, but not limited thereto. An arbitrary number of sets of the MAC, PHY, and IF may be provided in the present exemplary embodiment.

The IFs 153, 163, 173, and 183 are each an interface for communication with the other node. Packets input from the IFs 153, 163, 173, and 183 pass through the PHYs 152, 162, 172, and 182, respectively, and the MACs 151, 161, 171, and 181, respectively, and input to the packet switching section 140. At packet output time, adequate output IFs are determined by operation (to be described later) of the packet switching section 140, and packets are output to the IFs 153, 163, 173, and 183, respectively, through the MACs 151, 161, 171, and 181, respectively, and the PHYs 152, 162, 172, and 182, respectively.

The memory 110 is a storage device that stores a program controlling operation of the packet switching section 140 and necessary data. The CPU 120 reads the program and data from the memory 110 and performs arithmetic operation using the program and data to control the packet switching section 140. That is, the operations of the nodes including the node 100 are realized by cooperation of hardware such as the CPU, memory, and various interfaces and the program (software).

The console I/O 130 serves as an external interface concerning management of setup of each section in the device. For example, an execution instruction of OAM control in the present exemplary embodiment is made through the console I/O 130. Further, a result of the OAM control is notified to a user through the console I/O 130. The console I/O 130 may be an interface conforming to any standard.

Figure 3:
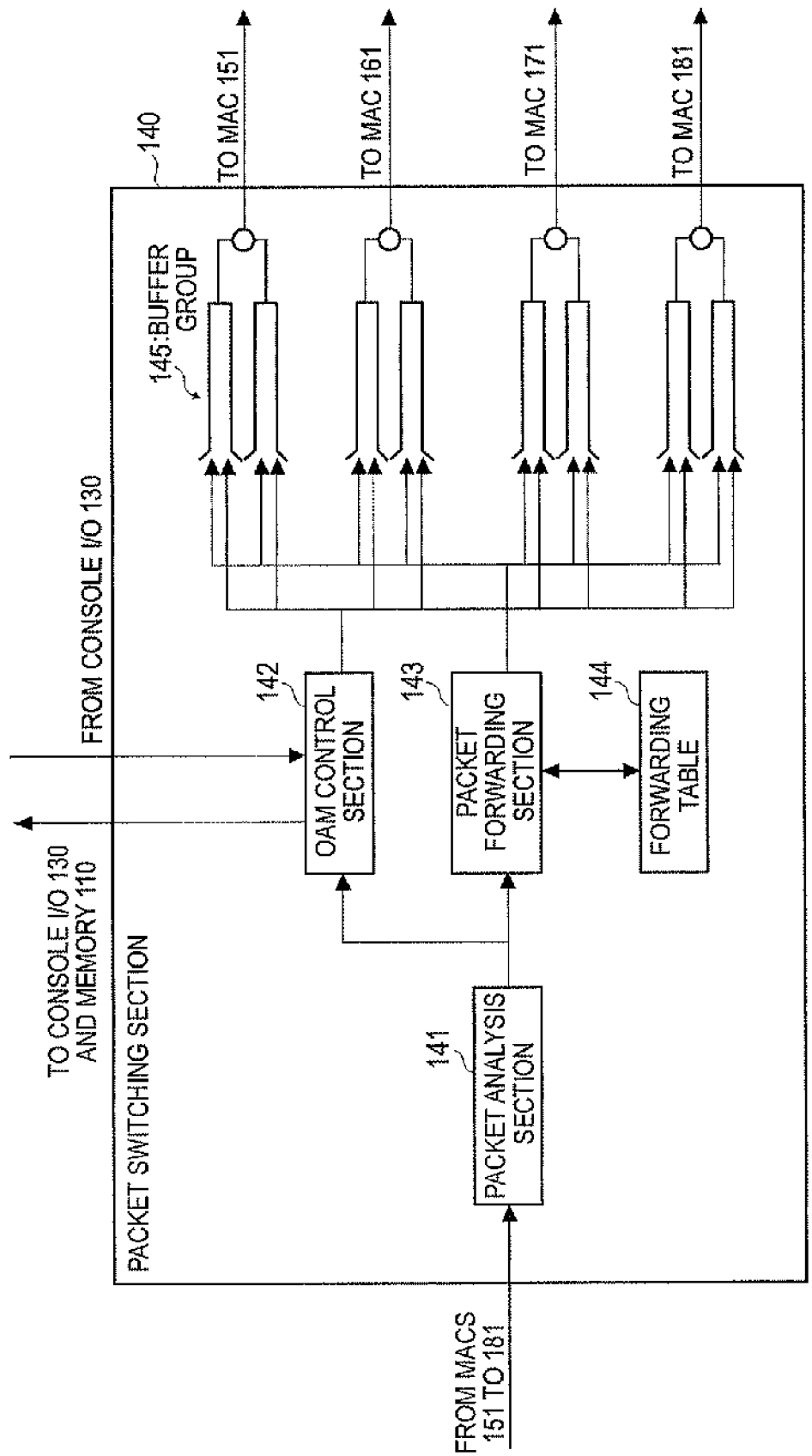
FIG. 3 A block diagram illustrating a basic configuration of a packet switching section in the exemplary embodiments of the present invention.

A detailed configuration of the packet switching section 140 in the present exemplary embodiment will be described with reference to FIG. 3.

The packet switching section 140 includes a packet analysis section 141, an OAM control section 142, a packet forwarding section 143, a forwarding table 144, and a buffer group 145.

The packet analysis section 141 analyzes packets input from the MACs 151, 161, 171, and 181. When determining, as a result of the analysis, that the input packet is a data packet, the packet analysis section 141 forwards the packet to the packet forwarding section 143. When determining that the input packet is an OAM packet, the packet analysis section 141 forwards the packet to the OAM control section 142.

The OAM control section 142 performs necessary processing according to content of the OAM packet received from the packet analysis section 141. Then, the OAM control section 142 refers to a forwarding table retained therein to determine an output port in accordance with destination address information included in the OAM packet and forwards the OAM packet to the corresponding buffer group 145. When receiving an execution instruction of the OAM control from the console I/O 130, the OAM control section 142 generates a corresponding OAM packet and outputs the OAM packet after performing necessary processing. At the same time, the OAM control section 142 displays a result of the executed OAM control on an external device through the console I/O 130. A detailed configuration of the OAM control section 142 will be described later.

The packet forwarding section 143 receives the data packet from the packet analysis section 141 and refers to the forwarding table 144 to acquire output port information in accordance with destination address information included in the data packet. Then, the packet forwarding section 143 forwards the data packet to the corresponding buffer group 145 according to priority of the packet.

The forwarding table 144 stores the output port information corresponding to the destination address information. A packet NW assumed in the present exemplary embodiment includes, for example, an Ethernet® NW and a MPLS-TP NW. These packet NWs are merely illustrative, and a packet NW conforming to a different standard may be used.

In a case where the Ethernet® NW is used, the forwarding table 144 stores an output port corresponding to "destination MAC address+VLAN"; while in a case where the MPLS-TP NW is used, the forwarding table 144 stores an output label and an output port corresponding to an input label.

The buffer group 145 temporarily stores the input packet and thereafter outputs the packet. In the present embodiment, priority classified (priority/non-priority) buffers are set as needed for priority control. In FIG. 3, the buffers are classified in two classes in terms of the priority; however, this is merely illustrative, and the buffers may be classified into arbitrary number of classes.

Figure 4:
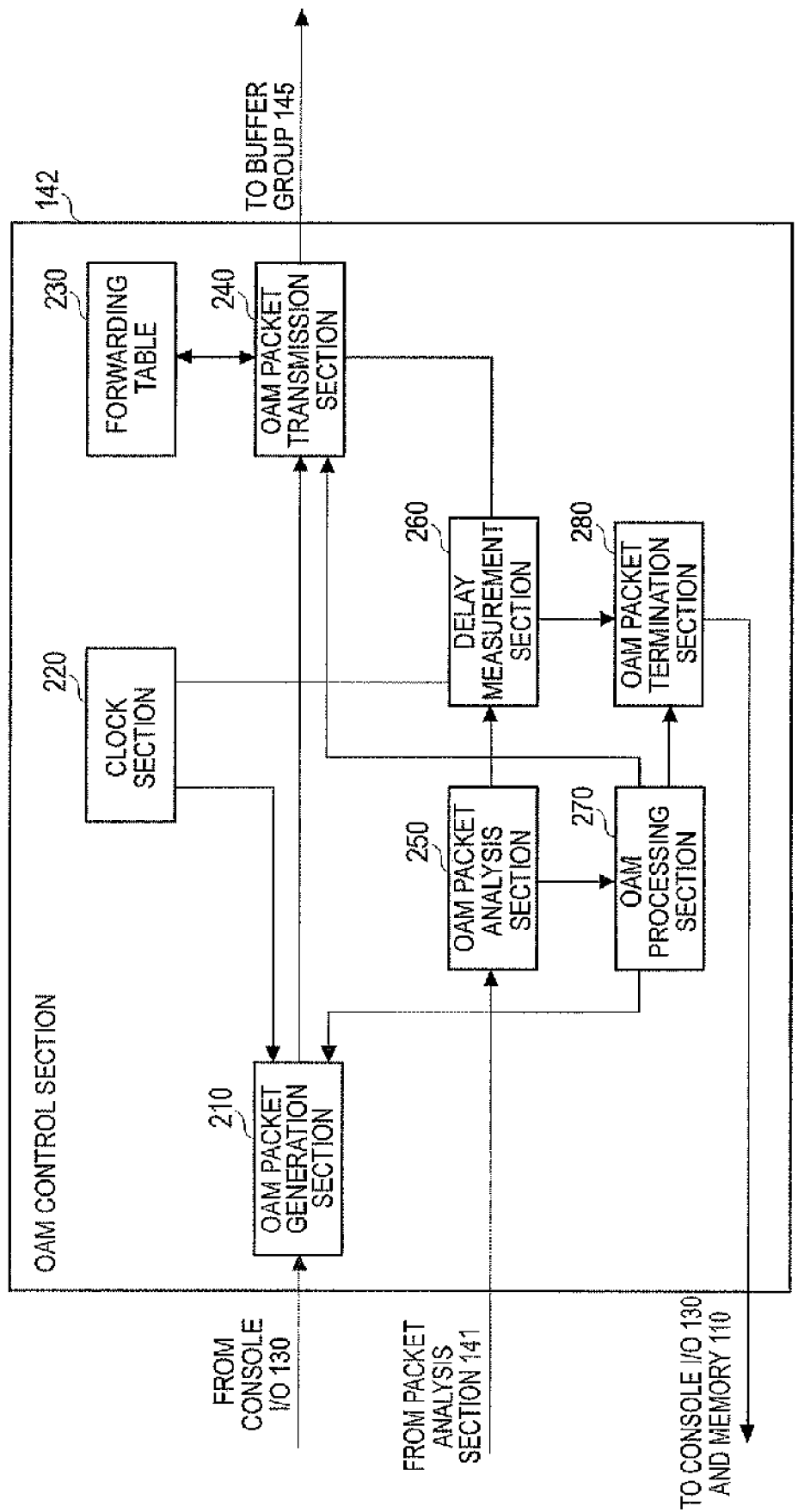
FIG. 4 A block diagram illustrating a basic configuration of an OAM control section in a first exemplary embodiment of the present invention.

A detailed configuration of the OAM control section 142 in the present exemplary embodiment will be described with reference to FIG. 4.

The OAM control section 142 includes an OAM packet generation section 210, a clock section 220, an OAM packet transmission section 240, a forwarding table 230, an OAM packet analysis section 250, a delay measurement section 260, an OAM processing section 270, and an OAM packet termination section 280.

The OAM packet generation section 210 generates a DM packet and an OAM packet other than the DM packet and forwards the generated packets to the OAM packet transmission section 240. The DM packet is forwarded every period that has previously set based on a clock of the clock section 220. For descriptive purpose, in the present exemplary embodiment, the OAM packet is classified into two categories: DM packet and a packet of a type other than the DM packet.

The clock section 220 generates a clock to be used in each node (in the present exemplary embodiment, nodes 100 to 103). The clock section 220 may generate the clock in its host node or in a manner synchronizing with a master clock existing outside.

The OAM packet transmission section 240 refers to the forwarding table 230 to acquire an output port corresponding to destination address information of the DM packet and OAM packet other than the DM packet and forwards the packets to the buffer group 145 corresponding to the output port.

The forwarding table 230 stores the output port information corresponding to the destination address information. The information stored in the forwarding table 230 are the same as those stored in the forwarding table 144.

The OAM packet analysis section 250 determines the type of the OAM packet received from the packet analysis section 141 and determines whether the destination information indicates the host node thereof or another node.

When determining, as a result of the determination, that the received OAM packet is the DM packet, the OAM packet analysis section 250 forwards the DM packet to the delay measurement section 260 together with the destination information, while when determining that the received OAM packet is the packet other than the DM packet, the OAM packet analysis section 250 forwards the packet other than the DM packet to the OAM processing section 270 together with the destination information.

The delay measurement section 260 includes a packet counter and monitors an increasing/decreasing state of a counter value to calculate a delay amount of the DM packet arriving thereat as delay information. Then, the delay measurement section 260 forwards the calculated delay information and DM packet to the OAM packet termination section 280. The present exemplary embodiment mainly aims to delay measurement of the DM packet, so the delay measurement section 260 executing the delay measurement is independently provided. However, the delay measurement function is part of the OAM function, so that a function equivalent to the delay measurement section 260 may be incorporated in the OAM processing section 270 to be described below.

The OAM processing section 270 receives the OAM packet other than the DM packet from the OAM packet analysis section 250 and then performs processing in accordance with the OAM type. The concrete contents of this processing is not a gist of the present invention, a detailed description thereof will be omitted. The OAM processing section 270 performs processing (relay, termination, reply) in accordance with a result of the processing.

The OAM packet termination section 280 receives the DM packet and OAM packet other than the DM packet and terminates the received packets. Further, the OAM packet termination section 280 performs, as needed, processing such as display of a result of the processing on an external device through the console I/O 130 or storing of the result in the memory 110. For example, in a case where a packet to be processed is the DM packet, the measured delay information is displayed as the processing result.

Figure 5:
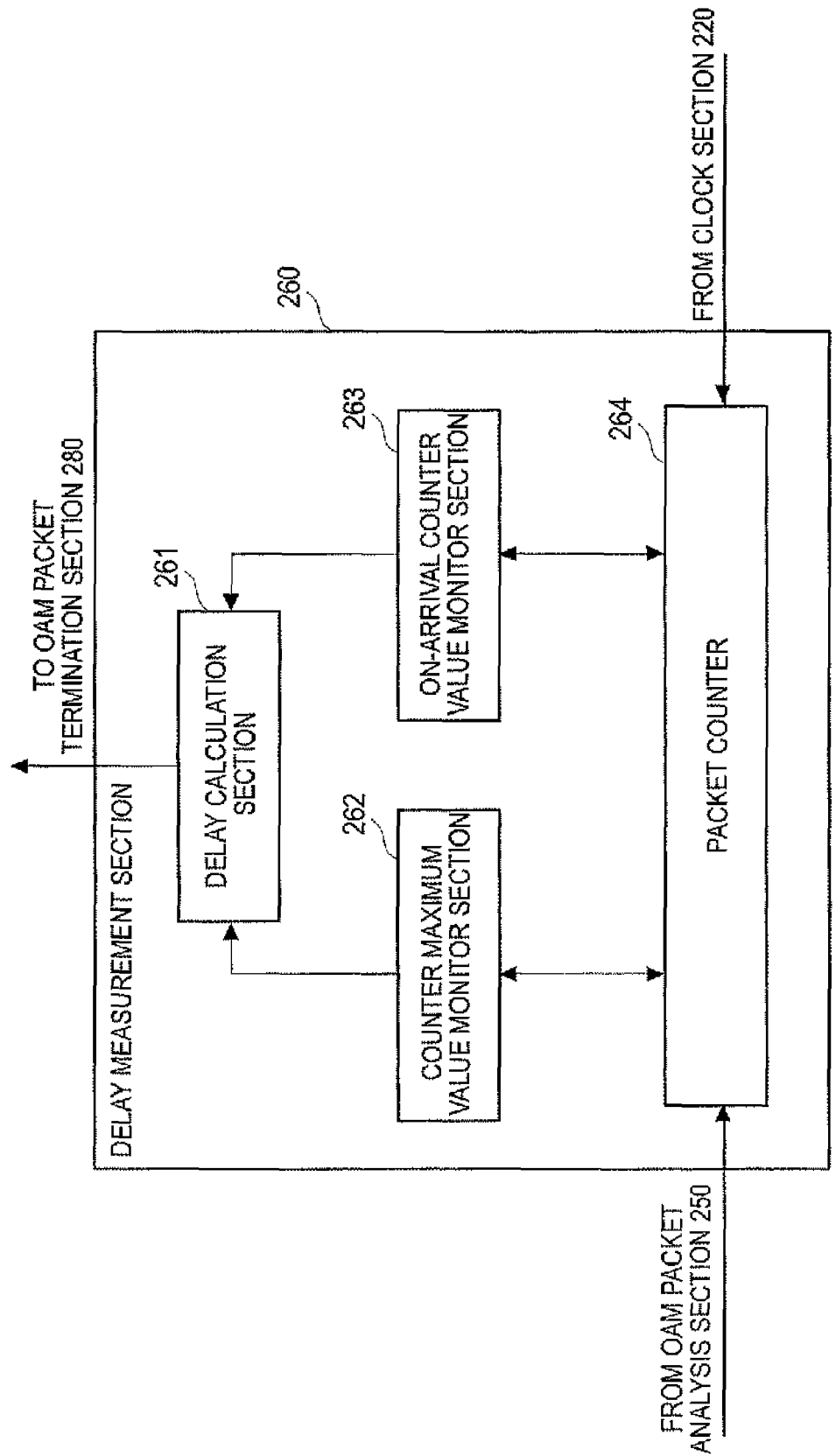
FIG. 5 A block diagram illustrating a basic configuration of a delay measurement section in the first exemplary embodiment of the present invention.

A detailed configuration of the delay measurement section 260 in the present exemplary embodiment will be described with reference to FIG. 5.

The delay measurement section 260 includes a delay calculation section 261, a counter maximum value monitor section 262, an on-arrival counter value monitor section 263, and a packet counter 264.

The counter maximum value monitor section 262 and on-arrival counter value monitor section 263 each monitor a counter value state of the packet counter 264 and notifies the delay calculation section 261 of a result of the monitoring.

The delay calculation section 261 calculates a delay using the notified information and notifies the OAM packet termination section 280 of a result of the calculation.

The packet counter 264 increases the counter value by predetermined number every time the packet counter 264 receives the DM packet from the OAM analysis section 250. At the same time, the packet counter 264 decreases the counter value according to the clock of the clock section 220. The packet counter 264 may be a packet buffer. In a case where the packet counter 264 is the packet buffer, the packet counter 264 stores the received DM packet in a buffer and, at the same time, outputs the stored packet according to the clock of the clock section 220.

The counter maximum value monitor section 262 monitors the counter value state of the packet counter 264 to monitor the maximum value thereof. In order to determine the maximum value, the counter maximum value monitor section 262 sets a predetermined monitoring period (e.g., 10 sec) and monitors a counter maximum value P (i) within a monitoring period i. After elapse of the monitoring period i, the counter maximum value monitor section 262 notifies the delay calculation section 261 of the counter maximum value P (i) within the monitoring period i.

The on-arrival counter value monitor section 263 monitors, when n-th DM packet within the monitoring period i arrives, a counter value C (i, n) at time of arrival of the DM packet. The on-arrival counter value monitor section 263 notifies the delay calculation section 261 of the counter value C (i, n) measured every time the DM packet arrives. The operations of the counter maximum value monitor section 262 and on-arrival counter value monitor section 263 are performed concurrently.

Every time the delay calculation section 261 receives the counter value C (i, n) from the on-arrival counter value monitor section 263, the delay calculation section 261 uses the counter value C (i, n) and the counter maximum value P (i) notified from the counter maximum value monitor section 262 to calculate a difference S (i, n) between the counter value C (i, n) and counter maximum value P (i).

Specifically, the difference S (i, n) is calculated according to the following equation.

$$S(i,n)=P(i-1)-C(i,n)$$

The counter maximum value P (i) represents the counter value at arrival time of a packet with zero delay. The on-arrival counter value C (i, n) is a value obtained by subtracting a counter value proportional to a delay amount of a target packet from the maximum value.

That is, the difference S (i, n) is proportional to the delay amount and a delay D (i, n) can be obtained by converting the differential counter value (bit count) into a time value using a link speed L [bps: bit per second].

Specifically, the delay D (i, n) is calculated according to the following equation.

$$D(i,n)=S(i,n)/L$$

Every time the delay calculation section 261 calculates the delay D (i, n), the delay calculation section 261 notifies the OAM packet termination section 280 of the calculated delay D (i, n) as delay information.

<Operation>

DM packet transmitting operation, DM packet receiving operation, and delay measuring operation at DM packet reception time in the delay measurement OAM of the present invention will be described using operation flows of FIGS. 6, 7, and 8.

Figure 6:
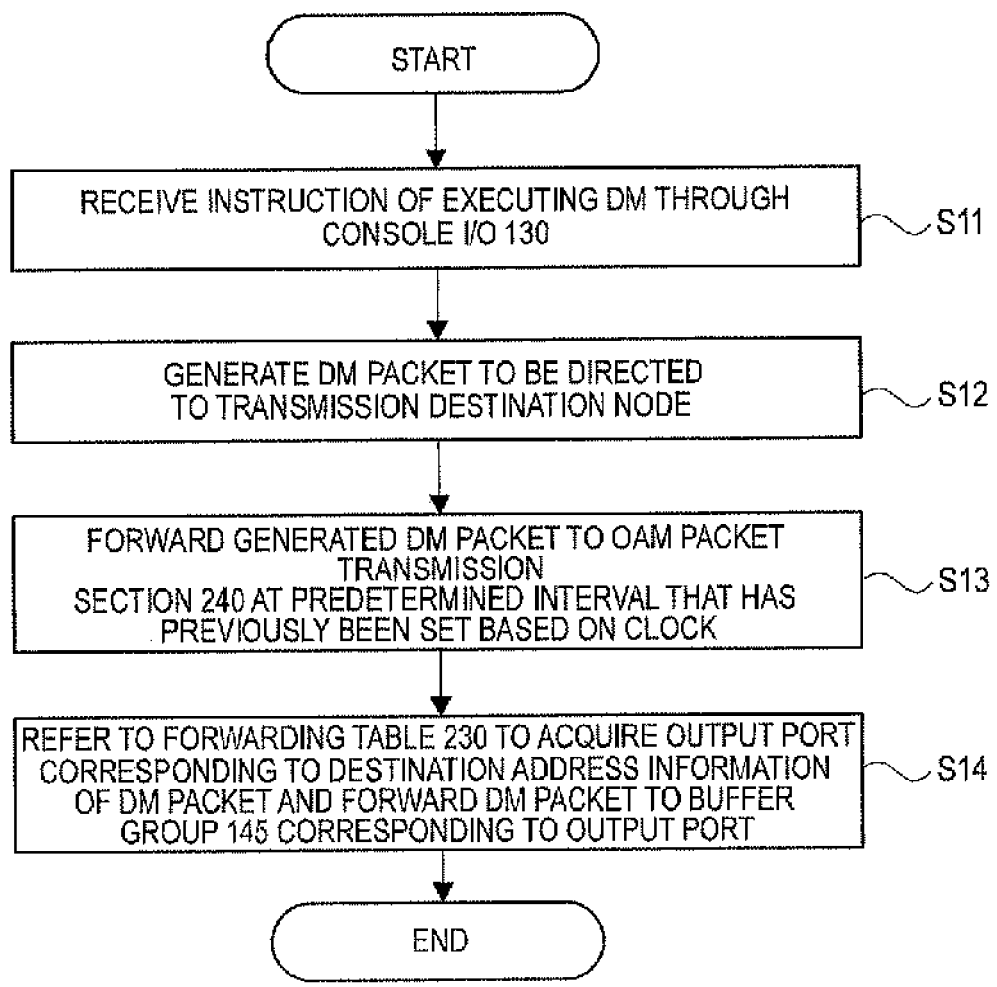
FIG. 6 A flowchart illustrating a flow of DM packet transmitting operation of an OAM processing section in the exemplary embodiments of the present invention.

FIG. 6 illustrates a flow of the DM packet transmitting operation in the transmission source node 100.

The OAM packet generation section 210 receives an instruction of executing the DM through the console I/O 130 (step S11).

Then, the OAM packet generation section 210 generates a DM packet to be directed to a transmission destination node (step S12).

Thereafter, the OAM packet generation section 210 forwards the DM packet generated in step S12 to the OAM packet transmission section 240 at a predetermined interval that has previously been set based on the clock of the clock section 220 (step S13).

Upon reception of the DM packet from the OAM packet generation section 210, the OAM packet transmission section 240 refers to the forwarding table 230 to acquire an output port corresponding to destination address information of the DM packet and forwards the DM packet to a buffer included in the buffer group 145 and corresponding to the output port (step S14).

The DM function may perform full-time measurement or on-demand measurement. In a case of the full-time measurement, after issuance of the DM execution instruction of Step S11, the forwarding of the DM packet which is performed at a predetermined interval in step S13 is repeated and continued. In a case of the on-demand measurement, when a test termination condition is satisfied such as reception of a DM termination instruction from the console I/O 130 or elapse of a prescribed measurement time, the forwarding in step S13 is stopped to terminate the delay measurement.

Next, with reference to a flow of the DM packet receiving operation of FIG. 7, receiving operation in the transmission destination node 103 will be described.

The OAM packet analysis section 250 receives the OAM packet from the packet analysis section 141 (step S21). Then, the OAM packet analysis section 250 analyzes whether the OAM packet is directed to its host node or another node and determines the type of the received OAM packet (step S22). When determining that the received packet is the DM packet, the OAM packet analysis section 250 forwards the DM packet to the delay measurement section 260 together with the destination address information (DM packet in step S22). On the other hand, when determining that the received packet is an OAM packet other than the DM packet, the OAM packet analysis section 250 forwards the packet to the OAM processing section 270 (packet other than DM packet in step S22) together with the destination address information.

Processing of step S23 and subsequent steps performed in the case where the OAM packet determined in step S22 is the DM packet will be described.

The delay measurement section 260 that has received the DM packet monitors the packet counter value at DM packet reception time to measure the delay. An operation flow concerning the delay measurement will be described in detail later using FIG. 8. Thereafter, the delay measurement section 260 forwards a result of the measurement and DM packet to the OAM packet termination section 280 (step S23).

Upon reception of the measurement result and DM packet from the delay measurement section 260, the OAM packet termination section 280 terminates the DM packet and performs post-processing such as display of the delay measurement result on an external device through the console I/O 130 or storing of the result in the memory 110 (step S24). Both or one of the display and storing of the delay measurement result in the memory 110 may be performed, or processing other than these processing may be performed.

On the other hand, when determining in step S22 that the OAM packet is the packet other than the DM packet, the OAM processing section 270 performs predetermined OAM processing for the received OAM packet and then performs relay/termination/reply (step S25). For example, in accordance with a result of the OAM processing, subsequent processing is performed as follows: a packet required to be forwarded to another node is forwarded to the OAM packet transmission section 240; a packet required to be terminated in this node is forwarded to the OAM packet termination section 280; and in a case where a new packet needs to be generated and forwarded to another node (e.g., a case where a Reply packet is sent back to the transmission source node), a packet generation instruction is issued to the OAM packet generation section 210. As described above, the concrete contents of this processing is not a gist of the present invention, a detailed description thereof will be omitted.

Next, operation concerning the delay measurement performed in step S23 will be described with reference to FIG. 8. FIG. 8 is a sequence diagram illustrating a flow of operation of the delay measurement section 260 performed in step S23.

First, operation of the counter maximum value monitor section 262 will be described.

The counter maximum value monitor section 262 monitors the counter maximum value P (i) within the monitoring period i (step S31).

After elapse of the monitoring period i, the counter maximum value monitor section 262 notifies the delay calculation section 261 of the measured counter maximum value P (i) within the monitoring period i (step S32). That is, the delay calculation section 261 receives the counter maximum value P (i) every time the monitoring period elapses.

Secondly, operation of the on-arrival counter value monitor section 263 performed concurrently with the operation of the counter maximum value monitor section 262 will be described.

Upon arrival of n-th DM packet within the monitoring period i, the on-arrival counter value monitor section 263 monitors the on-arrival counter value C (i, n) (step S33).

Then, every time when the DM packet arrives, the on-arrival counter value monitor section 263 notifies the delay calculation section 261 of the counter value C (i, n) measured for each arrival time (step S34).

Finally, operation of the delay calculation section 261 will be described.

Every time the delay calculation section 261 receives the counter value C (i, n) from the on-arrival counter value monitor section 263, the delay calculation section 261 uses the received counter value C (i, n) and the counter maximum value P (i) notified from the counter maximum value monitor section 262 to calculate the delay D (i, n) according to the following equation (step S35).

$$D(i,n) = \{P(i-1) - C(i,n)\}/L$$

It should be noted that the counter maximum value P (i) is represented as "P (i−1)". That is, the maximum value P (i−1) within a previous monitoring period is used for the delay calculation in the monitoring period i.

Finally, the delay calculation section 261 notifies the OAM packet termination section 280 of the delay information D (i, n) every time it calculates the delay D (i, n) (step S36).

The delay measurement using a delay measurement method according to the present exemplary embodiment will be described with reference to FIG. 9 and numerical examples shown therein.

Figure 9:
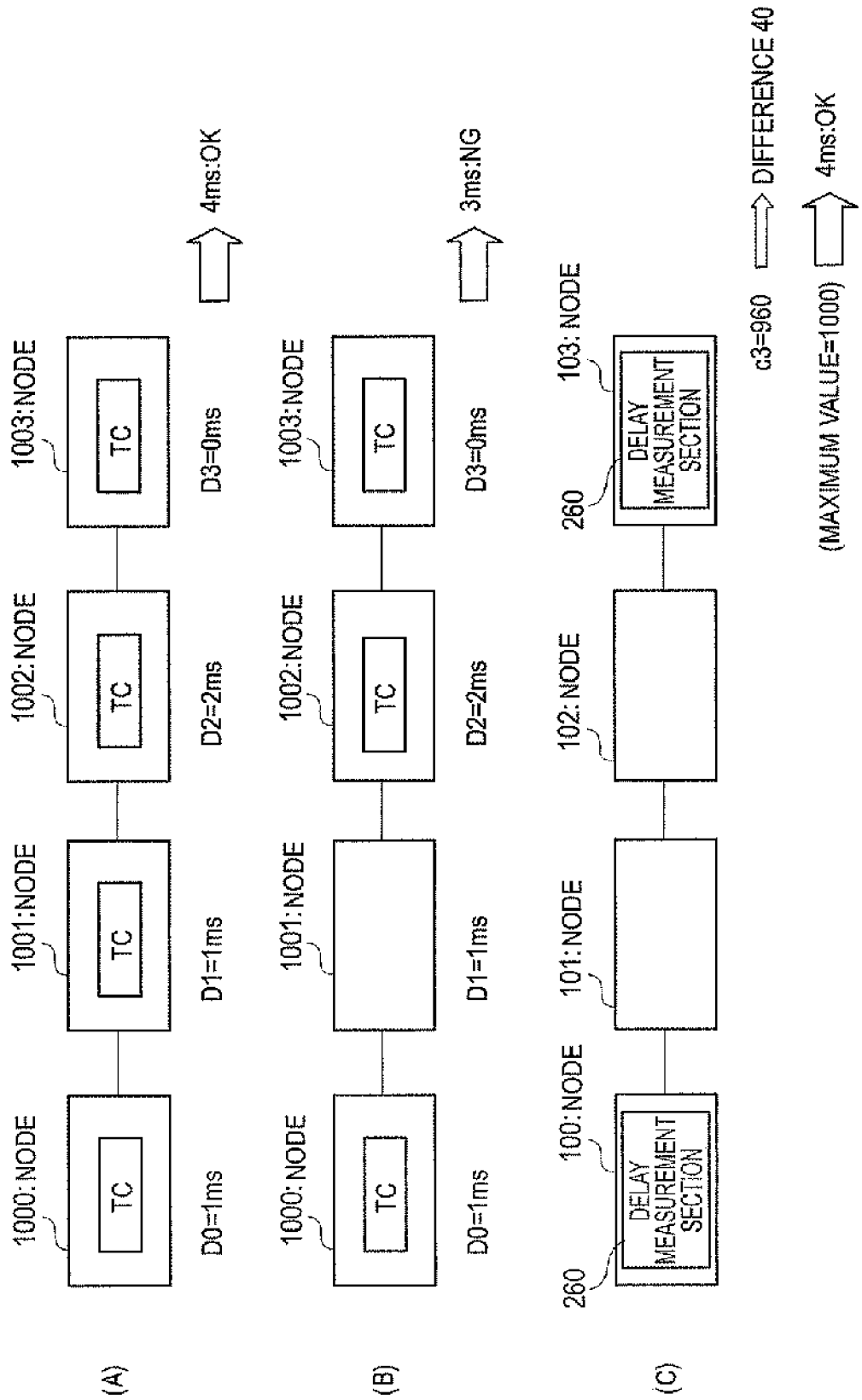
FIG. 9 A view illustrating delay measurement performed in a case where the delay measurement section of the first exemplary embodiment of the present invention is implemented.
Figure 17:
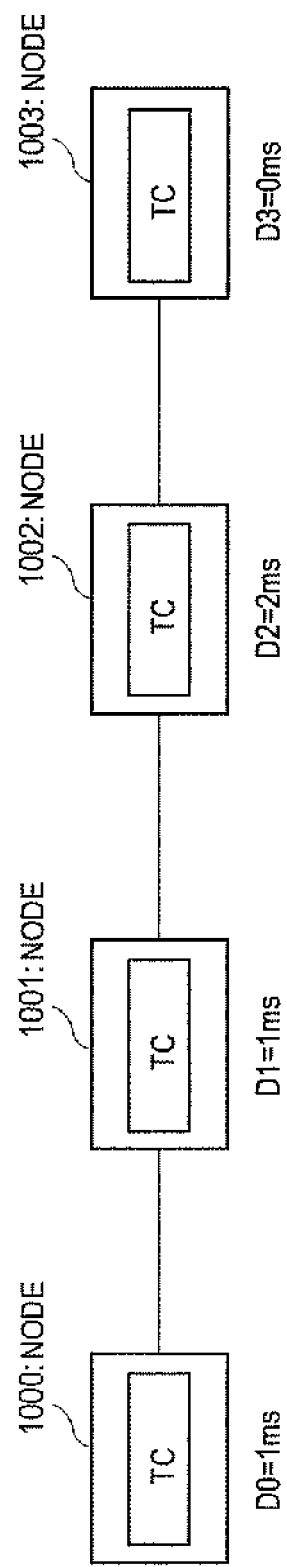
FIG. 17 A view illustrating delay measurement performed in a case where all nodes have IEEE 1582 v2 TC function.
Figure 18:
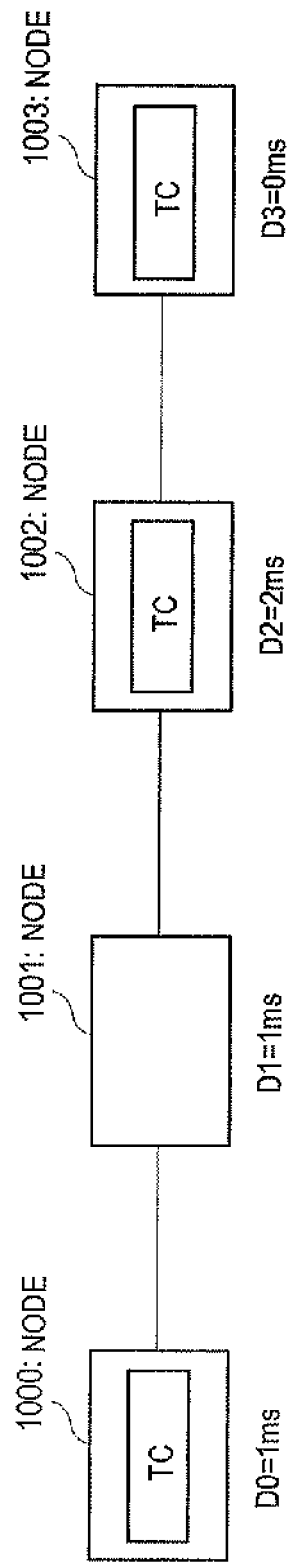
FIG. 18 A view illustrating delay measurement performed in a case where not all the nodes have IEEE 1582 v2 TC function.

In FIG. 9, numerical examples in the present exemplary embodiment are shown in the lowermost section as FIG. 9C. FIGS. 9A and 9B are shown as comparative examples in the uppermost section and middle section, respectively. FIG. 9A and FIG. 9B correspond to conventional examples illustrated in FIGS. 17 and 18, respectively.

In FIGS. 9A and 9B, the 1-way delay of the DM packet transmitted from the transmission source node 1000 to the transmission destination node 1003 is measured. In FIG. 9A, all the nodes 1000 to 1003 have the TC function. In FIG. 9B, the node 1001 having the TC function is replaced with the node 1001 that does not have the TC function. That is, in FIG. 9B, the node having no TC function exists on a network.

On the other hand, in the present exemplary embodiment, only the transmission source node 100 and transmission destination node 103 have the delay measurement section 260, and the relay nodes 101 and 102 are common nodes.

The delay time in the nodes 1000/100 to 1003/103 are assumed to be D0=1 ms/D1=1 ms/D2=2 ms/D3=0 ms. The counter maximum value of the packet counter 264 of the delay measurement section 260 according to the present exemplary embodiment is assumed to be 1,000, and a counter amount corresponding to a 1 ms delay is assumed to be 10.

Under such conditions, in the case of the comparative example of FIG. 9A in which all the nodes have the TC function, the delay time can be correctly calculated as: 1 ms+1 ms+2 ms=4 ms. In the case of the comparative example of FIG. 9B in which not all the nodes have the TC function, the intra-node delay time of the node 1001 that does not have the TC function is not added, resulting in a delay of 3 ms (1 ms+2 ms). Thus, the delay time is not measured correctly.

On the other hand, in the present exemplary embodiment, the counter value of the delay measurement section of the transmission destination node 103 indicates 960. This value is obtained by subtracting a counter value corresponding to a total delay time obtained by cumulative addition of the delay time in the transmission source node 100 and relay nodes 101 and 102 from the counter maximum value. A difference from the counter maximum value is 40, which corresponds to 4 ms in terms of delay time. Thus, it can be understood that the delay time can be measured correctly.

<Effects>

As described above, in the delay measurement method according to the present exemplary embodiment, implementation of the delay measurement section only in the transmission source and destination nodes allows the one-way delay time to be measured even in the absence of time synchronization between the both nodes. Thus, unlike the conventional technique, there is no need to implement the delay measurement section in the relay node. Therefore, existing relay nodes can be utilized without change, facilitating introduction of this system and increasing feasibility thereof.

Second Exemplary Embodiment

In the above-mentioned first exemplary embodiment, the end-to-end one-way delay between the transmission source and destination nodes is measured by implementing the delay measurement section only in the transmission source and destination nodes. In the second exemplary embodiment, a one-way delay between an arbitrary pair of nodes located between the transmission source and destination nodes is measured. This allows a delay generated for each zone to be grasped. Thus, in a case where delay degradation has occurred end-to-end, a bottle-neck zone can be specified, allowing finer Performance Monitoring.

As in the first exemplary embodiment, in a situation where time synchronization is not achieved between the nodes to be measured in terms of delay, the one-way delay time of the DM packet forwarded in a direction from the transmission source node to the transmission destination node is measured.

<Configuration>

Hereinafter, descriptions of the same constituent elements as those of the first exemplary embodiment will be omitted, and differences from the first exemplary embodiment will be described mainly. In the first exemplary embodiment, the relay node is an existing node in which the delay measurement section is not implemented, while in the second exemplary embodiment, a node serving as an end point of the zone to be measured is a node having the delay measurement section.

Figure 10:
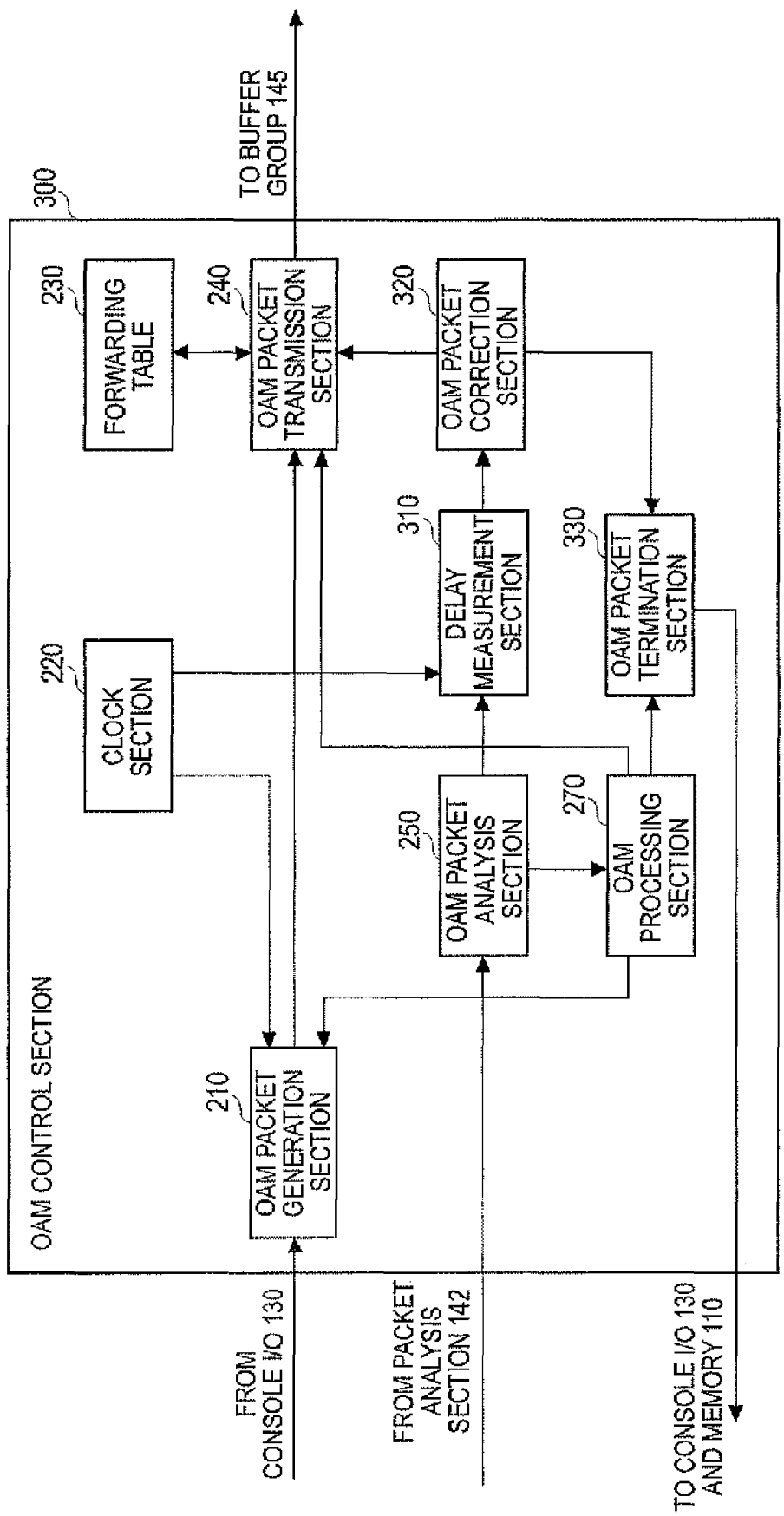
FIG. 10 A block diagram illustrating a basic configuration of the OAM control section in a second exemplary embodiment of the present invention.

The node serving as the end point of the zone to be measured includes, in the packet switching section 140, an OAM control section 300 in place of the OAM control section 142 provided in each of the nodes 100 to 103 of the first exemplary embodiment. With reference to FIG. 10, a configuration of the OAM control section 300 will be described.

The OAM control section 300 includes the OAM packet generation section 210, clock section 220, OAM packet transmission section 240, forwarding table 230, OAM packet analysis section 250, a delay measurement section 310, OAM processing section 270, an OAM termination section 330, and an OAM packet correction section 320. As compared to the OAM control section 142, the delay measurement section 260 is replaced with the delay measurement section 310, the OAM packet termination section 280 is replaced with the OAM packet termination section 330, and the OAM packet correction section 320 is newly added.

Figure 11:
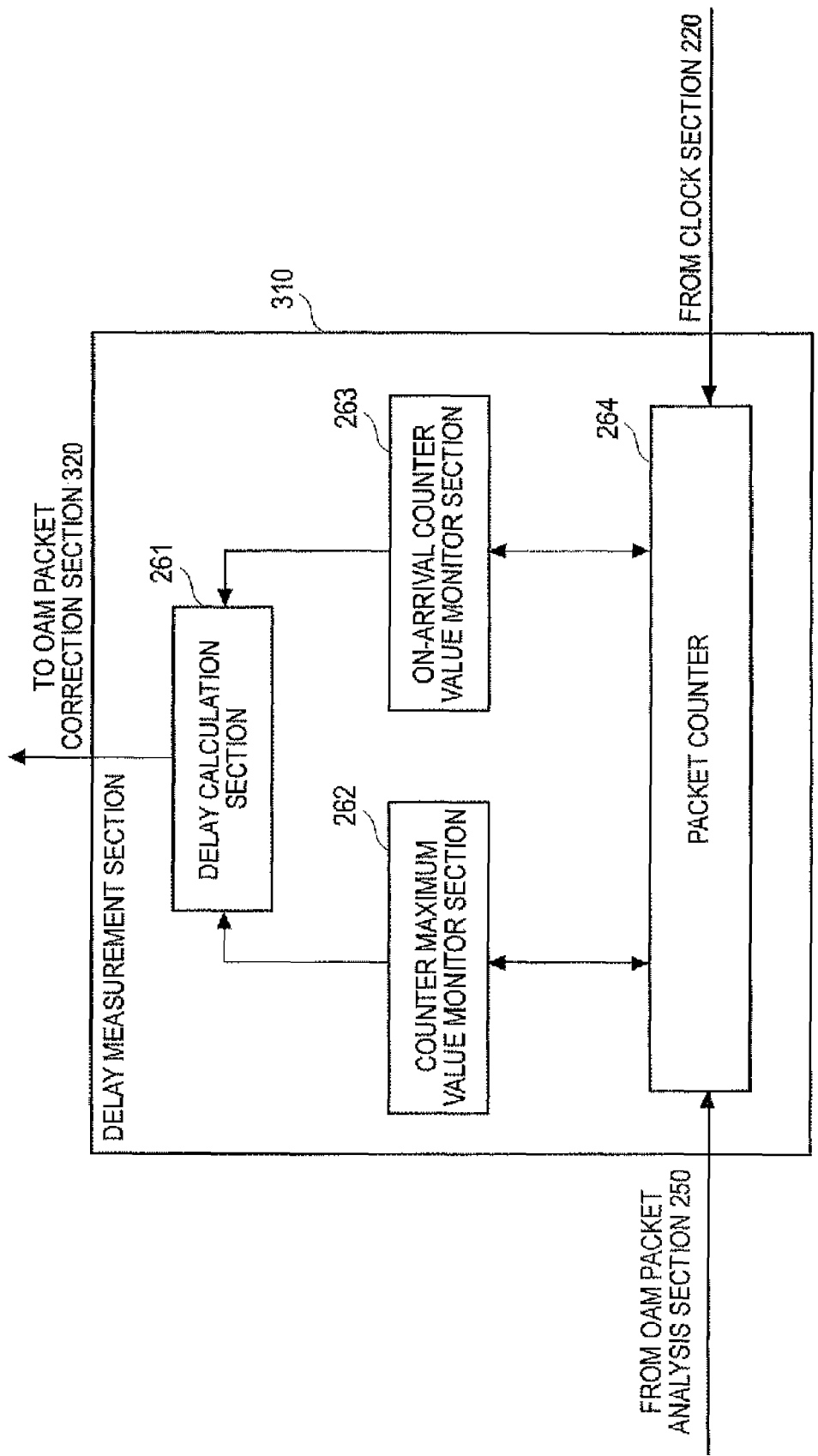
FIG. 11 A block diagram illustrating a basic configuration of a delay measurement section in the second exemplary embodiment of the present invention.

FIG. 11 illustrates a detailed configuration of the delay measurement section 310. As with the delay measurement section 260, the delay measurement section 310 includes the packet counter 264 and monitors an increasing/decreasing state of a counter value to calculate a delay amount of the DM packet arriving thereat. That is, the delay measurement section 310 and delay measurement section 260 are the same in basic configuration as each other; however, they are different from each other in forwarding destination of the measurement result. The delay measurement section 260 forwards the calculated delay information and DM packet to the OAM packet termination section 280; while the delay measurement section 310 forwards the calculated delay information and DM packet to the OAM packet correction section 320. Note that the information output from the delay measurement section 310 may be the on-arrival counter value before calculation of the delay to the OAM packet correction section 320. In this case, the counter values should be converted into the delay at one time in the transmission destination node 103.

The OAM packet correction section 320 additionally writes the delay information and node information into a predetermined field of the DM packet. After the additional writing, the OAM packet correction section 320 forwards the resultant DM packet to the OAM packet transmission section 240 in a case where the DM packet is a packet directed to another node, while forwards the resultant DM packet to the OAM packet termination section 330 in a case where the DM packet is a packet directed to its host node.

Upon reception of the DM packet, the OAM packet termination section 330 terminates the DM packet and calculates a zone-by-zone delay by using the delay information at each relay node to be stored therein. Further, the OAM packet termination section 330 performs processing such as display of calculated zone delay information on an external device through the console I/O 130 or storing of the information in the memory 110.

Upon reception of the OAM packet other than the DM packet, the OAM packet termination section 330 terminates the packet and performs, as needed, processing such as display of a processing result on an external device through the console I/O 130 or storing of the result in the memory 110.

<Operation>

The DM packet transmitting operation in the transmission source node 100 is the same as that illustrated in the flowchart of FIG. 6.

DM packet relaying operation/receiving operation in the relay node 101, relay node 102, and transmission destination node 103 will be described using an operation flowchart of FIG. 12.

Figure 7:
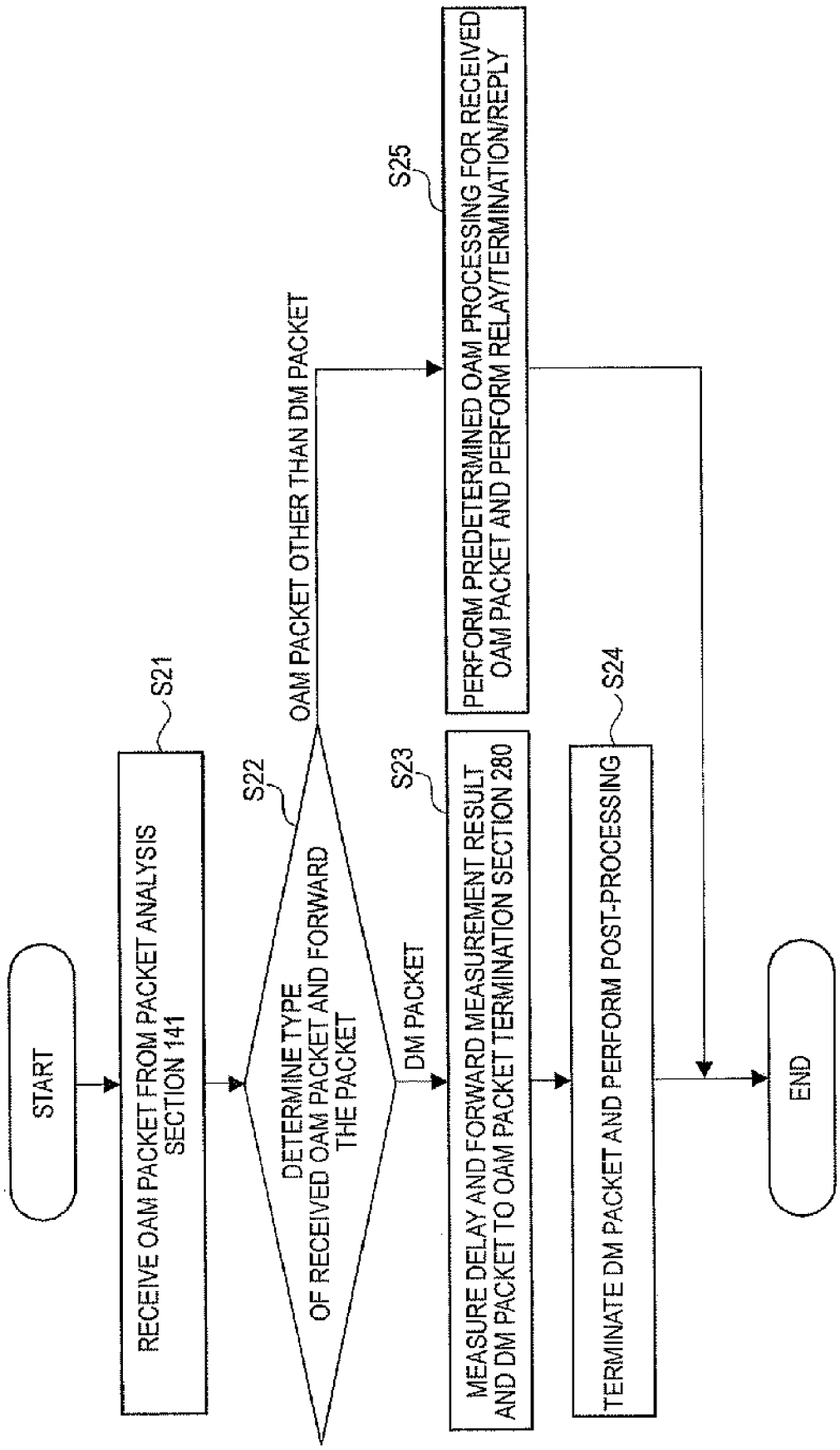
FIG. 7 A flowchart illustrating a flow of DM packet receiving operation of the OAM processing section in the first exemplary embodiment of the present invention.
Figure 8:
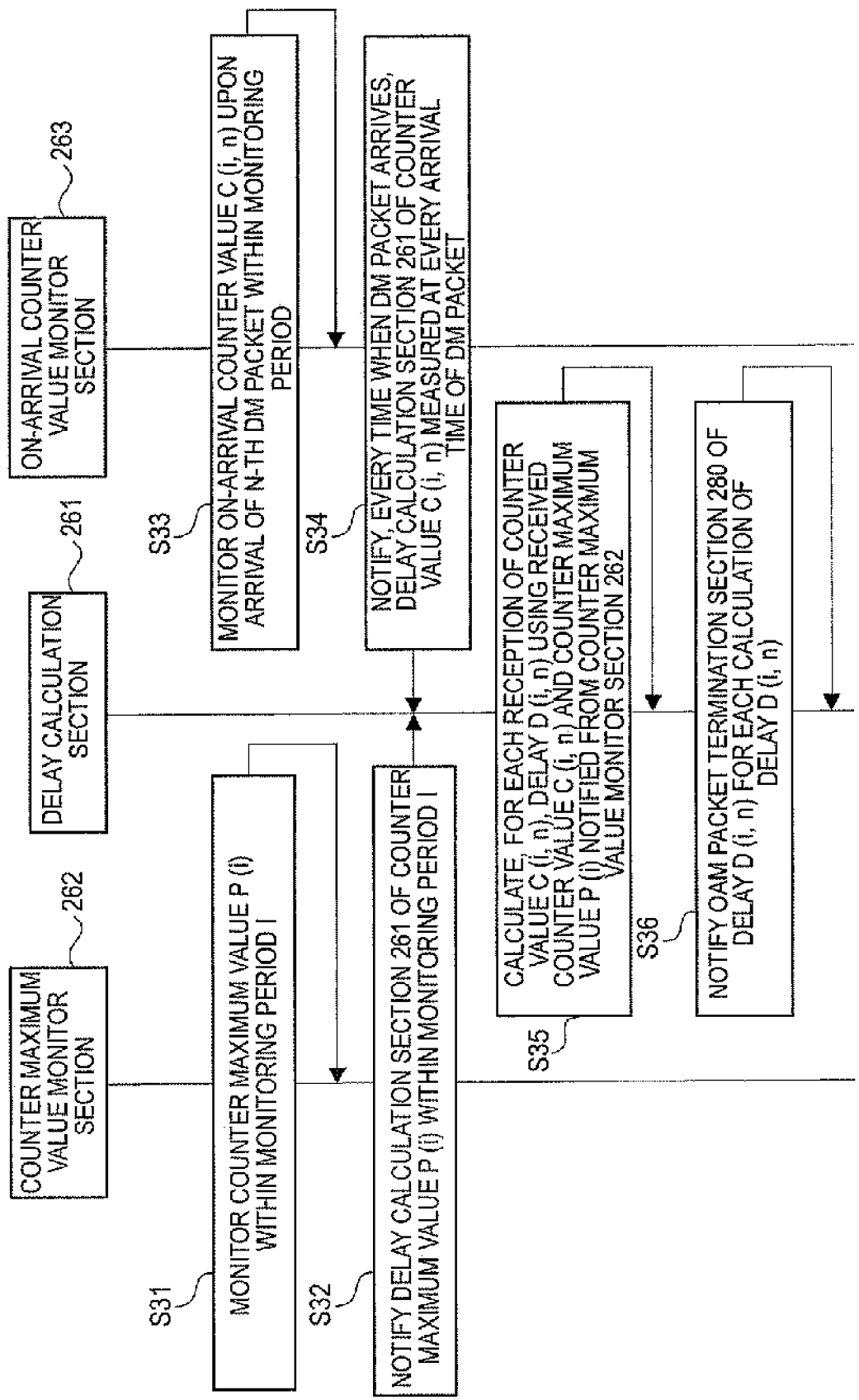
FIG. 8 A sequence diagram illustrating a flow of delay measurement operation of the delay measurement section in the first exemplary embodiment of the present invention.
Figure 12:
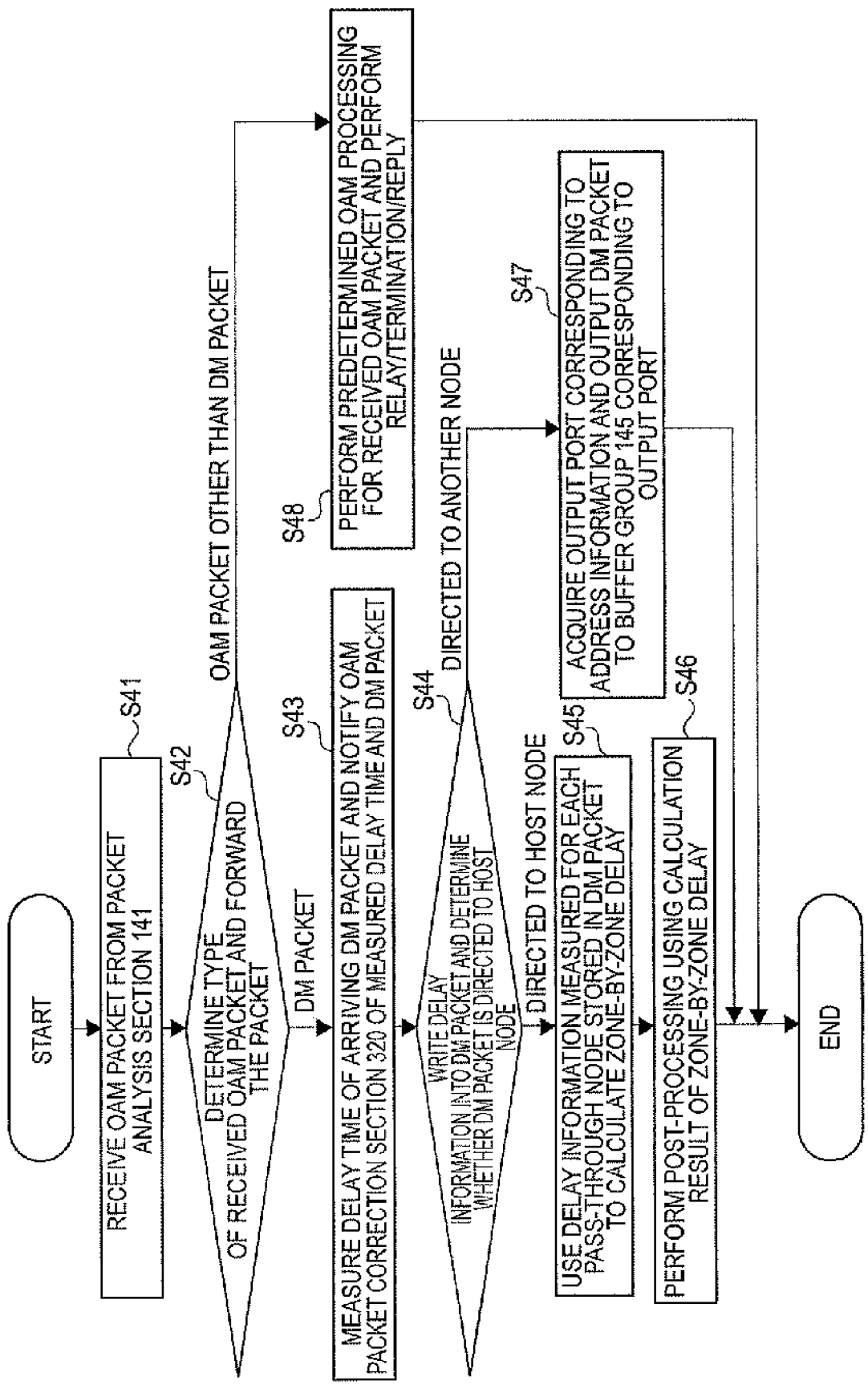
FIG. 12 A flowchart illustrating a flow of DM packet receiving operation of the OAM processing section in the second exemplary embodiment of the present invention.

The processing from step S41 to step S42 illustrated in FIG. 12, in which the OAM packet analysis section 250 forwards the DM packet and OAM packet other than the DM packet to the delay measurement section 310 and OAM processing section 270, respectively is the same as processing from step S21 to step S22 illustrated in FIG. 7. Further, a part in which the OAM processing section 270 performs predetermined processing for the OAM packet other than the DM packet in step S48 illustrated in FIG. 12 is the same as processing of step S25 illustrated in FIG. 7. Hereinafter, a flow of processing from step S43 to step S47 to be performed for the DM packet which differs from the processing of FIG. 7 will be described.

The delay measurement section 310 that has received the DM packet from the OAM packet analysis section 250 measures a delay time of the arriving DM packet and notifies the OAM packet correction section 320 of the measured delay time and DM packet (step S43). The delay time measurement method employed here is the method illustrated in FIGS. 5 and 8. The delay time that can be measured by this method is a cumulative delay time between the transmission source node 100 and a measurement node. That is, the delay to be measured at each measurement node is as follows.

At transmission destination node 103: delay between transmission source node 100 and transmission destination node 103 (hereinafter described to as "D_0→3")

At relay node 101: delay between transmission source node 100 and relay node 101 (hereinafter described to as "D_0→1")

At relay node 102: delay between transmission source node 100 and relay node 102 (hereinafter described to as "D_0→2")

The OAM packet correction section 320 that has received the delay time from the delay measurement section 310 additionally writes delay information and a node ID for identifying the node into a predetermined field (e.g., a TLV part) of the DM packet. That is, every time the DM packet passes through the node, the delay information between the transmission source node and the pass-through node is written into the DM packet. This allows the transmission destination node 103 to acquire the transmission source node-to-pass-through node delay information for each of all the pass-through nodes.

After writing the delay information to the DM packet, the OAM packet correction section 320 forwards the DM packet to the OAM packet termination section 330 in a case where the DM packet is directed to its host node (host node: transmission destination node 103) ("directed to host node" in step S44). On the other hand, in a case where the DM packet is directed to another node (host node: relay node 101 or 102), the OAM packet correction section 320 forwards the DM packet to the OAM transmission section 240 ("directed to another node" in step S44).

Next, processing performed in a case where the DM packet is directed to the host node will be described.

The OAM packet termination section 330 that has received the DM packet from the OAM packet correction section 320 uses the zone-by-zone delay information stored in the DM packet to calculate zone-by-zone delay (step S45). Here, the zone-by-zone delay to be calculated is assumed to be a hop-by-hop delay. That is, the zone-by-zone delay to be calculated are: delay between transmission source node 100 and relay node 101 (hereinafter described as "D_0→1"), delay between relay node 101 and relay node 102 (hereinafter described to as "D_1→2"); and delay between relay node 102 and transmission destination node 103 (hereinafter described to as "D_2→3").

The zone-by-zone delay at one node corresponds to a difference between the delay between previous and subsequent nodes and delay between the previous node and the target node and can be calculated as follows:

$$D\_0 \rightarrow 1 = D\_0 \rightarrow 1$$

$$D\_1 \rightarrow 2 = D\_0 \rightarrow 2 - D\_0 \rightarrow 1$$

$$D\_2 \rightarrow 3 = D\_0 \rightarrow 3 - D\_0 \rightarrow 2$$

Thereafter, the OAM packet termination section 330 performs processing such as notification of a calculation result of the zone-by-zone delay calculated in step S45 to the console I/O 130 or storing of the result in the memory 110 (step S46).

Finally, processing performed in a case where the DM packet being processed is directed to another node will be described.

The OAM packet transmission section 240 that has received, from the OAM packet correction section 320, the DM packet directed to another node refers to the forwarding table 230 to acquire an output port corresponding to the address information and outputs the DM packet to the buffer group 145 corresponding to the output port (step S47).

According to the operation flow described above, the delay time between the transmission source node 100 and node 101, delay time between the transmission source node 100 and node 102, and delay time between the transmission source node 100 and node 103 are measured while the DM packet is relayed, and the measured delay information are stored in the DM packet. The transmission destination node 103 can acquire the delay information at each pass-through node from the received packet. By using the delay information, the hop-by-hop (zone-by-zone) delay can advantageously be calculated.

Next, delay measurement using the delay measurement method according to the present exemplary embodiment will be described with reference to FIGS. 13 to 16 and numerical examples shown therein.

Figure 13:
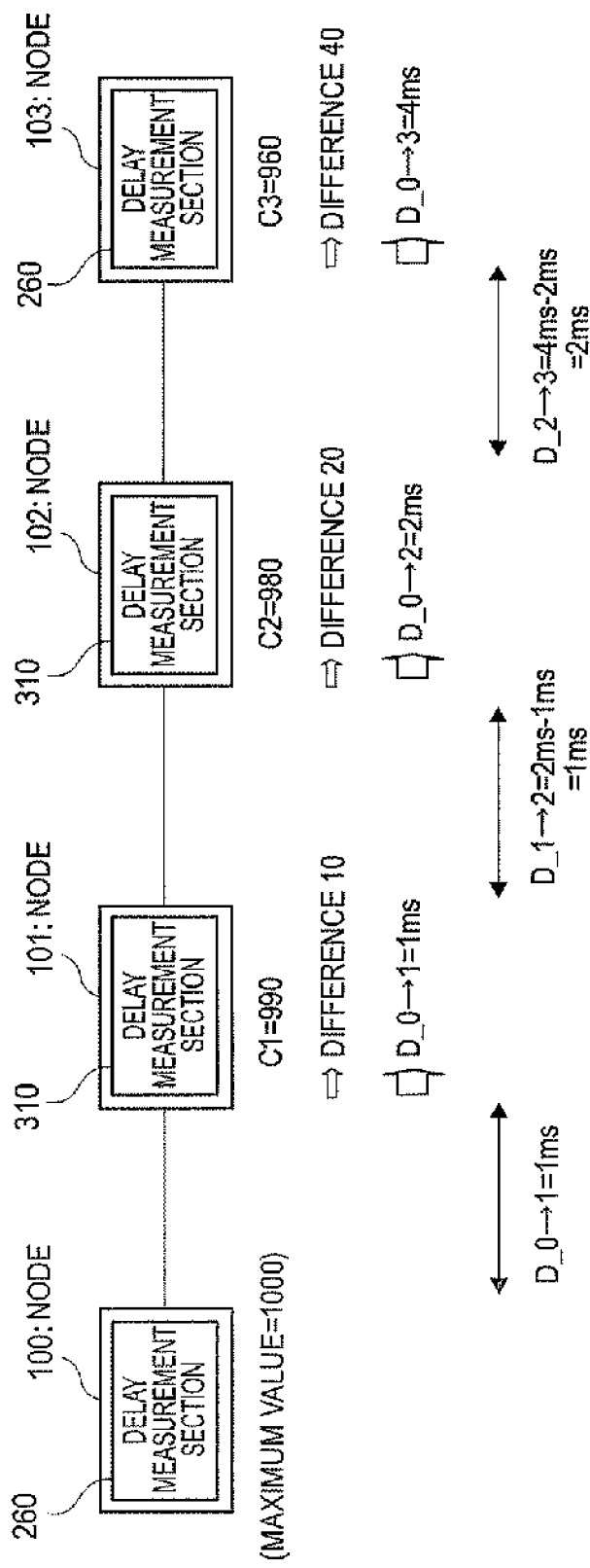
FIG. 13 A view (1/4) for explaining, using concrete numerical examples, an effect of the exemplary embodiments of the present invention.

(Example 1) illustrated in FIG. 13 is a concrete example of a case where the delay measurement section 260 or delay measurement section 310 according the present exemplary embodiment is implemented in all the nodes to measure the zone-by-zone delay between each pair of nodes.

The 1-way delay of the DM packet transmitted from the transmission source node 100 to the transmission destination node 103 is measured. The delay time in the node 100, node 101, node 102, and node 103, are assumed to be D0=1 ms/D1=1 ms/D2=2 ms/D3=0 ms. The counter maximum value of the packet counter 264 of the delay measurement section according to the present exemplary embodiment is assumed to be 1,000, and a counter amount corresponding to a 1 ms delay is assumed to be 10.

Under such conditions, the counter values of the delay measurement section 260 or 310 in the nodes 101, 102, and 103 indicate 990, 980, and 960, respectively. Differences of the above counter values from the counter maximum value are 10, 20, and 40, respectively, which correspond to 1 ms, 2 ms, and 4 ms, in terms of delay time. The delay information indicating the delay time between each node and the transmission source node 100 measured in reach node is stored in the DM packet together with a node ID, and the DM packet arrives at the transmission destination node 103. As a result, the transmission destination node can acquire the following delay information:

Node 101|delay=1 ms(=D_0→1)

Node 102|delay=2 ms(=D_0→2)

Node 103|delay=4 ms(=D_0→3)

Based on the above delay information, the OAM packet termination section 330 can calculate the zone-by-zone delay as follows:

Delay between transmission source node 100 and relay node 101=D_0→1=D_0→1=1 ms

Delay between relay node 101 and relay node 102=D_1→2=D_0→2−D_0→1=2 ms−1 ms=1 ms Delay between relay node 102 and transmission destination node 103=D_2→3=D_0→3−D_0→2=4 ms−2 ms=2 ms The calculation of the zone-by-zone delay allows identification of, e.g., a node in which delay time increases due to occurrence of congestion.

Figure 14:
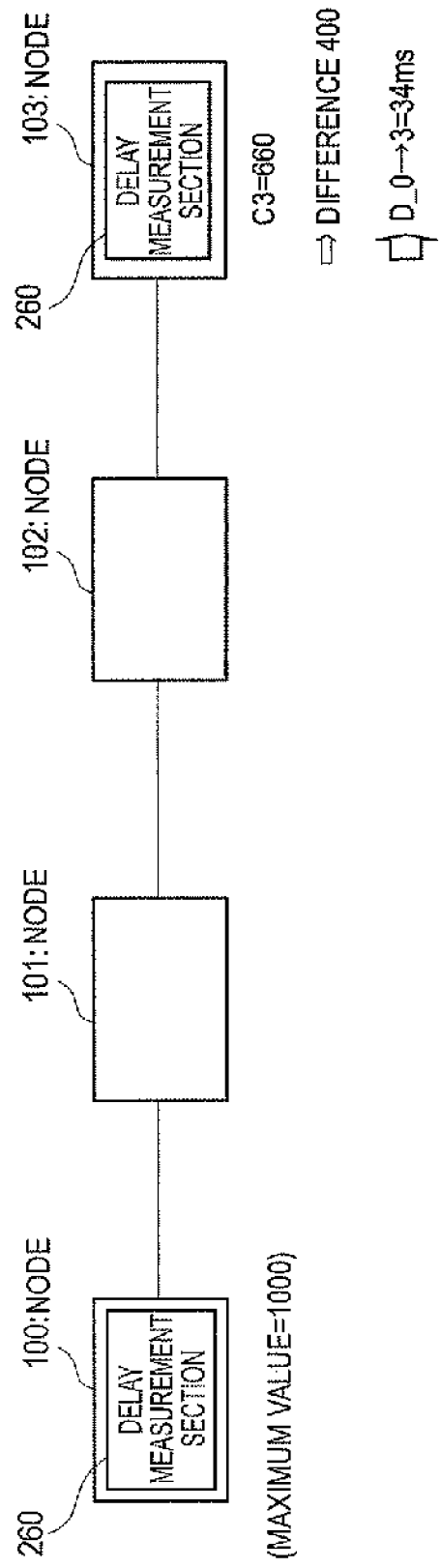
FIG. 14 A view (2/4) for explaining, using concrete numerical examples, an effect of the exemplary embodiments of the present invention.
Figure 15:
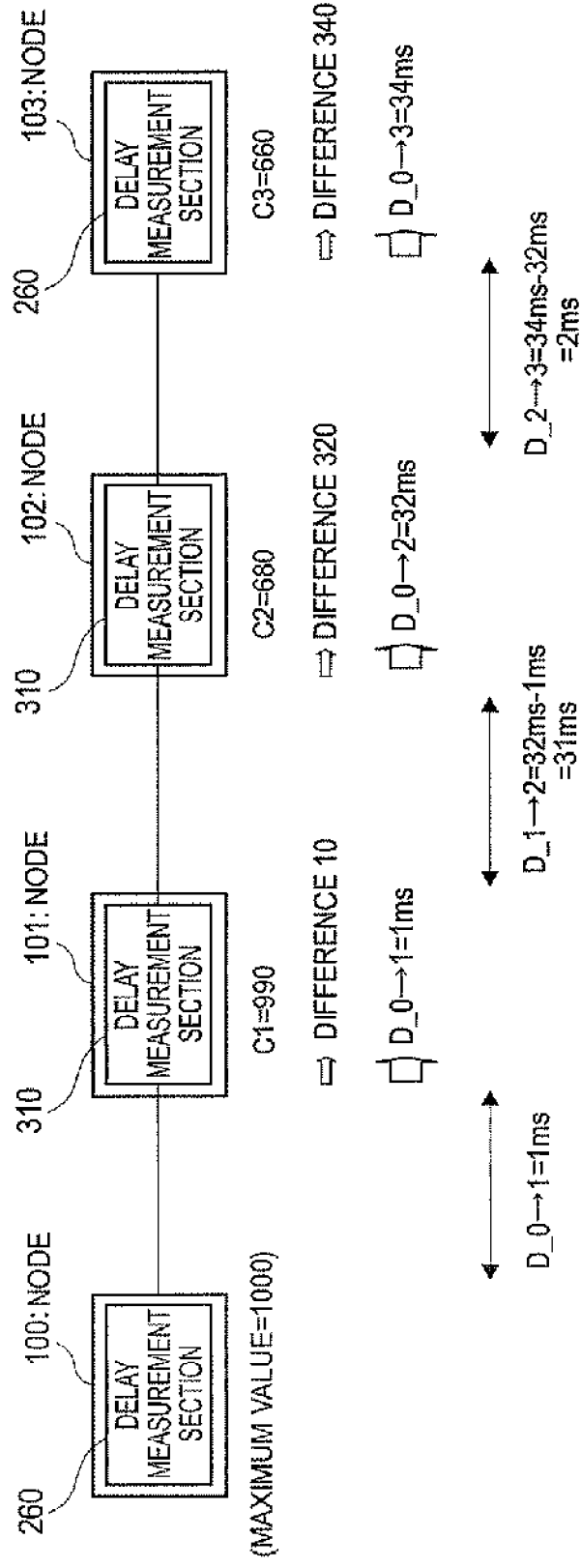
FIG. 15 A view (3/4) for explaining, using concrete numerical examples, an effect of the exemplary embodiments of the present invention.

FIG. 14 (example 2-1) and FIG. 15 (example 2-2) each illustrate a case where the delay time D1 of the node 101 is increased to 31 ms in the configuration of FIG. 13 (example 1). FIG. 14 (example 2-1) illustrates a case where the end-to-end delay is calculated as in the case of the first embodiment, and FIG. 15 (example 2-2) illustrates a case where the zone-by-zone delay is calculated.

In FIG. 14 (example 2-1), the transmission destination node 103 can measure delay D_0→3=340 ms based on the packet counter value. That is, the delay increases more than usual and it is found that congestion has occurred on a route from the transmission source node 100 to the transmission destination node 103. However, the end-to-end delay information cannot identify a bottle-neck node.

On the other hand, in FIG. 15 (example 2-2), the transmission destination node 103 can acquire the following delay information as the delay information of each pass-through node as in the case of FIG. 13 (example 1):

Node 101|delay=1 ms(=D_0→1)

Node 102|delay=32 ms(=D_0→2)

Node 103|delay=34 ms(=D_0→3)

Based on the above delay information, the OAM packet termination section 330 can calculate the zone-by-zone delay as follows:

Delay between transmission source node 100 and relay node 101=D_0→1=D_0→1=1 ms

Delay between relay node 101 and relay node 102=D_1→2=D_0→2−D_0→1=32 ms−1 ms=31 ms Delay between relay node 102 and transmission destination node 103=D_2→3=D_0→3−D_0→2=34 ms−32 ms=2 ms The calculation of the zone-by-zone delay allows a fact that the delay between relay node 101 and relay node 102 increases to 31 ms to be found and allows the relay node 101 to be identified as the bottle neck node.

FIG. 13 (example 1) and FIG. 15 (example 2-2) each illustrate a case where the delay measurement section is implemented in all the nodes. With this configuration, the zone-by-zone delay can be measured with respect to the routes between all the nodes. However, in the delay measurement method in the present exemplary embodiment, the delay measurement section need not be implemented in all the nodes, but should be implemented only in the nodes serving as the end points of the zone for which the zone-by-zone delay needs to be measured. In IEEE 1588 v2 w/TC, which is a conventional technique, the delay cannot be measured accurately in the presence of a relay node in which the TC function is not implemented; while in the present invention, it is sufficient to implement the delay measurement section only in a necessary node.

Figure 16:
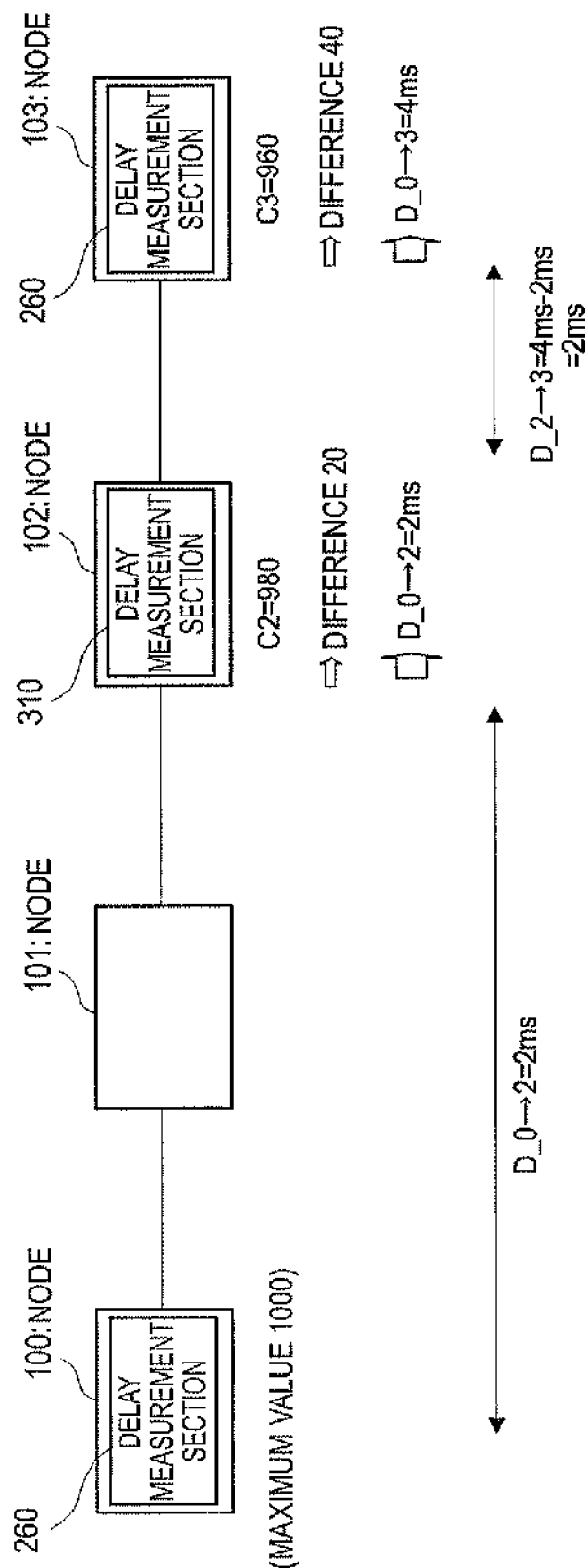
FIG. 16 A view (4/4) for explaining, using concrete numerical examples, an effect of the exemplary embodiments of the present invention.

FIG. 16 (example 3) illustrates a case where the delay measurement section 260 or 310 is implemented only in the measurement nodes. In this example, a common node is used as the node 101. In such a case, the nodes 102 and 103 each measure the delay and store the delay information in the DM packet; while the node 101 does not write the delay information. As a result, the transmission destination node 103 can acquire the following delay information as the delay information of each pass-through node:

Node 102|delay=2 ms(=$D\_0 \rightarrow 2$)

Node 103|delay=4 ms(=$D\_0 \rightarrow 3$)

Based on the above delay information, the OAM packet termination section 330 can calculate the zone-by-zone delay as follows:

Delay between transmission source node 100 and relay node 102=$D\_0 \rightarrow 2$=2 ms Delay between relay node 102 and transmission destination node 103=$D\_2 \rightarrow 3$=$D\_0 \rightarrow 3$-$D\_0 \rightarrow 2$=4 ms-2 ms=2 ms As described above, even there exists a node in which the delay measurement section 260 or 310 is not implemented, it is possible to calculate the zone-by-zone delay of the node in which the delay measurement section 260 or 360 is implemented.

<Effects>

As described above, in the delay measurement method according to the present exemplary embodiment, the one-way delay time can be measured even in the absence of time synchronization between both nodes. Further, implementation of the delay measurement section in arbitrary nodes located between the both nodes allows the zone-to-zone delay between the arbitrary nodes to be measured, thereby allowing identification of a bottle-neck node or zone in a case where an increase in the end-to-end delay time occurs, which results in achievement of finer management. When the delay measurement section according to the present exemplary embodiment is implemented in all the nodes, the zone-to-zone delay between all the nodes can be measured, and when the delay measurement section is implemented in certain nodes, the zone-to-zone delay between all the certain nodes can be measured. Thus, unlike the conventional technique, the delay measurement section, need not be implemented in all the relay nodes, but it is sufficient to implement the delay measurement section only in the measurement target relay nodes, thereby facilitating introduction of this system and increasing feasibility thereof.

The node according to the exemplary embodiments of the present invention can be realized by hardware. Alternatively, the node can be realized when a computer reads a program that allows the computer to function as the node from a computer-readable recording medium and executes the program.

The delay measurement method according to the exemplary embodiments of the present invention can be realized by hardware. Alternatively, the delay measurement method can be realized when a computer reads a program that allows the computer to execute the method from a computer-readable recording medium and executes the program.

Further, in the above exemplary embodiments, it has been described that a programs specific to the exemplary embodiments is previously stored in each node. However, the program for operating a computer as the entirety or part of the node or for executing the above described processing may be distributed in a state of being stored in a computer-readable recording medium such as a flexible disk, CD-ROM (Compact Disk Read-Only Memory), DVD (Digital Versatile Disk), MO (Magneto Optical Disk), or BD (Blu-ray Disk), and the program may be installed in another computer so as to be operated as the above-described means or caused to execute above-described processing steps. Further, the program may be stored in a disk drive or the like that a server on the Internet has. In this case, for example, the program is superimposed on a carrier wave and downloaded to a computer for execution.

It should be appreciated that the above described embodiments are preferred exemplary embodiments only, and are not intended to limit the scope of the present invention. The present invention may be implemented by modifying the embodiments in various ways within the gist of the present invention.

This application is based upon and claims the benefit of priority from prior Japanese Patent Application No. 2010-224842 (filed Oct. 4, 2010) under the Paris Convention, the entire contents of Japanese Patent Application No. 2010-224842 are incorporated herein by reference thereto.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

The whole or part of the exemplary embodiments disclosed above can be described, as, but not limited to, the following supplementary notes.

(Supplementary note 1) A delay measurement system that includes a transmission source and a transmission destination node connected to the transmission source node over a network including a relay node, and measures a delay time in a direction from the transmission source node to the transmission destination node, wherein the transmission source node comprises:

a source clock generation section that generates a clock;

a control packet generation section that generates a delay measurement packet at a regular interval based on the clock generated by the source clock generation section; and a control packet transmission section that transmits the generated delay measurement packet to the transmission destination node, and the transmission destination node comprises:

a control packet analysis section that selects the delay measurement packet from a reception frame; and a delay measurement section that measures a delay of the delay measurement packet transmitted from the transmission source node in the network to its host node therein.

(Supplementary note 2) The delay measurement system according to the supplementary note 1, wherein
the transmission destination node further includes a destination clock generation section that generates a clock, and
the delay measurement section included in the transmission destination node includes:
a packet counter that increases a counter value thereof for each reception of the delay measurement packet and decreases the counter value according to the clock of the destination clock generation section to manage an arrival state and an output state of the delay measurement packet as the counter value; and
a delay calculation section that monitors the counter value managed by the packet counter to calculate a queuing delay added, in the packet network, to the delay measurement packet transmitted from the transmission source node.

(Supplementary note 3) The delay measurement system according to supplementary note 1 or 2, wherein
the delay measurement section included in the transmission destination node further includes:
a counter maximum value monitor section that monitors the counter value managed by the packet counter for a predetermined measurement time period to detect a counter value at time of arrival of a packet with zero queuing delay from the transmitted delay measurement packets and sets the detected counter value as a reference value; and
an on-arrival counter value monitor section that monitors a counter value at time of arrival of the delay measurement packet, and
the delay calculation section calculates the queuing delay from a difference between the reference value and the counter value monitored by the on-arrival counter value monitor section.

(Supplementary note 4) A delay measurement system that measures a delay time on a network including a transmission source node, a transmission destination node connected to the transmission source node through relay nodes, and the relay nodes that relay communication from the transmission source node to the transmission destination node,
the transmission source node including:
a source clock generation section that generates a clock;
a control packet generation section that generates a delay measurement packet at a regular interval based on the clock generated by the source clock generation section; and
a control packet transmission section that transmits the generated delay measurement packet to the transmission destination node,
the relay nodes each including:
a control packet analysis section that selects the delay measurement packet from a reception frame;
a delay calculation section that calculates a delay time of the delay measurement packet transmitted from the transmission source node in the network to its host node therein;
a control packet correction section that stores the calculated delay time and a node identifier of its host node in the delay measurement packet to correct the delay measurement packet; and
a control packet transmission section that transmits the delay measurement packet corrected by the correction section toward the transmission destination node, the transmission destination node including:
a control packet analysis section that selects the delay measurement packet from a reception frame; and
a delay measurement section that measures a delay of the delay measurement packet transmitted from the transmission source node in the network to its host node therein,
the transmission destination node calculating, based on the delay time and node identifier stored in the delay measurement packet, any one or a combination of the delay time between the transmission source node and transmission destination node, delay time between the transmission source node and relay node, delay time between the relay nodes, and delay time between the relay node and transmission destination node.

(Supplementary note 5) The delay measurement system according to supplementary note 4, wherein
the relay nodes each further includes:
a relay node clock generation section that generates a clock; and
a packet counter that increases a counter value thereof for each reception of the delay measurement packet and decreases the counter value according to the clock of the relay node clock generation section to manage an arrival state and an output state of the delay measurement packet as the counter value,
the control packet correction section of each relay node stores, in the delay measurement packet, a counter value of the delay measurement packet at time of arrival and the node identifier of its host node, and
the transmission destination node calculates, based on packet counter value information stored in the delay measurement packet, counter values between the transmission source node and relay node, between the relay nodes, and between the relay node and transmission destination node and converts each of the calculated counter values into the delay time.

(Supplementary note 6) The delay measurement system according to supplementary note 4 or 5, comprising, as the relay nodes, a first relay node and a second relay node located at a position on the network which is nearer to the transmission destination node than the first relay node, wherein
the transmission destination node calculates the delay between the first and second relay nodes from a difference between a first delay time measured in the first relay node and a second delay time measured in the second relay node.

(Supplementary note 7) A delay measurement device that serves as a transmission destination node connected to a transmission source node over a network including a relay node and measures a delay time between the transmission source node and the transmission destination node, including:
an interface that receives a delay measurement packet generated at a regular interval based on a source clock generated by the transmission source node;
a control packet analysis section that selects the delay measurement packet from a reception frame; and
a delay measurement section that measures a delay of the delay measurement packet transmitted over the network from the transmission source node to its host node.

(Supplementary note 8) The delay measurement device according to supplementary note 7, further including a destination clock generation section that generates a clock, wherein the delay measurement section of the delay measurement device includes:
a packet counter that increases a counter value thereof for each reception of the delay measurement packet and decreases the counter value according to the clock of the destination clock generation section to manage an arrival state and an output state of the delay measurement packet as the counter value; and
a delay calculation section that monitors the counter value managed by the packet counter to calculate a queuing delay added, in the packet network, to the delay measurement packet transmitted from the transmission source node.

(Supplementary note 9) The delay measurement device according to supplementary note 7 or 8, wherein
the delay measurement section of the delay measurement device further includes:
a counter maximum value monitor section that monitors the counter value managed by the packet counter for a predetermined measurement time period to detect a counter value at time of arrival of a packet with zero queuing delay from the transmitted delay measurement packets and sets the detected counter value as a reference value; and
an on-arrival counter value monitor section that monitors a counter value at time of arrival of the delay measurement packet, and
the delay calculation section calculates the queuing delay from a difference between the reference value and the counter value monitored by the on-arrival counter value monitor section.

(Supplementary note 10) A delay measurement method that a system including a transmission source node and a transmission destination node connected to the transmission source node over a network including a relay node performs to measure a delay time in a direction from the transmission source node to the transmission destination node, including steps of:
generating a clock by the transmission source node;
generating a delay measurement packet at a regular interval by the transmission source node based on the generated clock;
transmitting the generated delay measurement packet to the transmission destination node by the transmission source node;
selecting the delay measurement packet from a reception frame by the transmission destination node; and
measuring a delay of the delay measurement packet transmitted from the transmission source node in the network to its host node therein by the transmission destination node.

(Supplementary note 11) The delay measurement method according to supplementary note 10, wherein:
the transmission destination node generates a clock;
the transmission destination node prepares a packet counter that increases a counter value thereof for each reception of the delay measurement packet and decreases the counter value according to the clock generated by the transmission destination node to manage an arrival state and an output state of the delay measurement packet as the counter value; and
the transmission destination node monitors the counter value managed by the packet counter to calculate a queuing delay added, in the packet network, to the delay measurement packet transmitted from the transmission source node.

(Supplementary note 12) The delay measurement method according to supplementary note 10 or 11, wherein:
the transmission destination node monitors the counter value managed by the packet counter for a predetermined measurement time period to detect a counter value at time of arrival of a packet with zero queuing delay from the transmitted delay measurement packets and setting the detected counter value as a reference value;
the transmission destination node monitors a counter value at time of arrival of the delay measurement packet; and
the transmission destination node calculates the queuing delay from a difference between the reference value and the monitored counter value.

(Supplementary note 13) A delay measurement method performed by a system including a network including a transmission source node, a transmission destination node connected to the transmission source node through relay nodes, and the relay nodes that relay communication from the transmission source node to the transmission destination node, including steps of:
generating a clock by the transmission source node;
generating, by the transmission source node, a delay measurement packet at a regular interval based on the clock generated by the transmission source node;
transmitting the generated delay measurement packet to the transmission destination node by the transmission source node;
selecting the delay measurement packet from a reception frame by each of the relay nodes;
calculating a delay time of the delay measurement packet transmitted from the transmission source node in the network to its host node therein by each of the relay nodes;
storing the calculated delay time and a node identifier of its host node in the delay measurement packet to correct the delay measurement packet by each of the relay nodes;
transmitting the corrected delay measurement packet toward the transmission destination node by each of the relay nodes;
selecting the delay measurement packet from a reception frame by the transmission destination node;
measuring a delay of the delay measurement packet transmitted from the transmission source node in the network to its host node therein by the transmission destination node; and
calculating, based on the delay time and node identifier stored in the delay measurement packet, any one or a combination of the delay time between the transmission source node and transmission destination node, delay time between the transmission source node and relay node, delay time between the relay nodes, and delay time between the relay node and transmission destination node by the transmission destination node.

(Supplementary note 14) The delay measurement method according to supplementary note 13, wherein:
the relay nodes each generates a clock;
the relay nodes each prepares a packet counter that increases a counter value thereof for each reception of the delay measurement packet and decreases the counter value according to the clock generated by the relay node to manage an arrival state and an output state of the delay measurement packet as the counter value;
the relay nodes each stores, in the delay measurement packet, a counter value of the delay measurement packet at time of arrival and the node identifier of its host node; and the transmission destination node calculates, based on packet counter value information stored in the delay measurement packet, counter values between the transmission source node and relay node, between the relay nodes, and between the relay node and transmission destination node and converts each of the calculated counter values into the delay time.

(Supplementary note 15) The delay measurement method according to supplementary note 13 or 14, wherein:

the system includes, as the relay nodes, a first relay node and a second relay node located at a position on the network which is nearer to the transmission destination node than the first relay node; and the transmission destination node calculates the delay between the first and second relay nodes from a difference between a first delay time measured in the first relay node and a second delay time measured in the second relay node.

(Supplementary note 16) A delay measurement program that is installed in a transmission destination node connected to a transmission source node over a network including a relay node and measures a delay time between the transmission source node and the transmission destination node, allowing a computer to function as:

an interface that receives a delay measurement packet generated at a regular interval based on a source clock generated by the transmission source node;

a control packet analysis section that selects the delay measurement packet from a reception frame; and a delay measurement section that measures a delay of the delay measurement packet transmitted over the network from the transmission source node to its host node.

(Supplementary note 17) The delay measurement program according to supplementary note 16, wherein the transmission destination node further includes a destination clock generation section that generates a clock, and the delay measurement section of the transmission destination node includes:

a packet counter that increases a counter value thereof for each reception of the delay measurement packet and decreases the counter value according to the clock of the destination clock generation section to manage an arrival state and an output state of the delay measurement packet as the counter value; and a delay calculation section that monitors the counter value managed by the packet counter to calculate a queuing delay added, in the packet network, to the delay measurement packet transmitted from the transmission source node.

(Supplementary note 18) The delay measurement program according to supplementary note 16 or 17, wherein the delay measurement section of the transmission destination node further includes:

a counter maximum value monitor section that monitors the counter value managed by the packet counter for a predetermined measurement time period to detect a counter value at time of arrival of a packet with zero queuing delay from the transmitted delay measurement packets and sets the detected counter value as a reference value; and an on-arrival counter value monitor section that monitors a counter value at time of arrival of the delay measurement packet, and the delay calculation section calculates the queuing delay from a difference between the reference value and the counter value monitored by the on-arrival counter value monitor section.

The invention claimed is:

1. A delay measurement system that includes a transmission source node and a transmission destination node connected to the transmission source node over a network including a relay node, and measures a delay time in a direction from the transmission source node to the transmission destination node, wherein the transmission source node comprises:

a source clock generation section that generates a clock;

a control packet generation section that generates a delay measurement packet at a regular interval based on the clock generated by the source clock generation section; and a control packet transmission section that transmits the generated delay measurement packet to the transmission destination node, and the transmission destination node comprises:

a control packet analysis section that selects the delay measurement packet from a reception frame;

a delay measurement section that measures a delay with which the delay measurement packet is transmitted from the transmission source node to the transmission destination node itself in the network; and a destination clock generation section that generates another clock, wherein the delay measurement section includes:

a packet counter that increases a counter value for each reception of the delay measurement packet and decreases the counter value according to the another clock of the destination clock generation section to manage an arrival state and an output state of the delay measurement packet as the counter value; and a delay calculation section that monitors the counter value managed by the packet counter to calculate a queuing delay added, in the network, to the delay measurement packet transmitted from the transmission source node.

2. The delay measurement system according to claim 1, wherein the delay measurement section included in the transmission destination node further includes:

a counter maximum value monitor section that monitors the counter value managed by the packet counter for a predetermined measurement time period to detect a counter value at time of arrival of a packet with zero queuing delay from the transmitted delay measurement packets and sets the detected counter value as a reference value; and an on-arrival counter value monitor section that monitors a counter value at time of arrival of the delay measurement packet, and the delay calculation section calculates the queuing delay from a difference between the reference value and the counter value monitored by the on-arrival counter value monitor section.

3. A delay measurement system that measures a delay time on a network including a transmission source node, a transmission destination node connected to the transmission source node through relay nodes, and the relay nodes that relay communication from the transmission source node to the transmission destination node, comprising:

the transmission source node comprising:
a source clock generation section that generates a clock;
a control packet generation section that generates a delay measurement packet at a regular interval based on the clock generated by the source clock generation section; and
a control packet transmission section that transmits the generated delay measurement packet to the transmission destination node,
the relay nodes each comprising:
a control packet analysis section that selects the delay measurement packet from a reception frame;
a delay calculation section that calculates a delay time of the delay measurement packet transmitted from the transmission source node to the relay node itself in the network;
a control packet correction section that stores the calculated delay time and a node identifier of the relay node itself in the delay measurement packet to correct the delay measurement packet; and
a control packet transmission section that transmits the delay measurement packet corrected by the correction section toward the transmission destination node,
the transmission destination node including:
a control packet analysis section that selects the delay measurement packet from a reception frame; and
a delay measurement section that measures a delay of with which the delay measurement packet is transmitted from the transmission source node to the transmission destination node itself in the network,
the transmission destination node calculating, based on the delay time and node identifier stored in the delay measurement packet, any one or a combination of the delay time between the transmission source node and transmission destination node, delay time between the transmission source node and relay node, delay time between the relay nodes, and delay time between the relay node and transmission destination node.

4. The delay measurement system according to claim 3, wherein
the relay nodes each further includes:
a relay node clock generation section that generates a clock; and
a packet counter that increases a counter value for each reception of the delay measurement packet and decreases the counter value according to the clock of the relay node clock generation section to manage an arrival state and an output state of the delay measurement packet as the counter value,
the control packet correction section of each relay node stores, in the delay measurement packet, a counter value of the delay measurement packet at time of arrival and the node identifier of the relay node itself, and
the transmission destination node calculates, based on packet counter value information stored in the delay measurement packet, counter values between the transmission source node and relay node, between the relay nodes, and between the relay node and transmission destination node and converts each of the calculated counter values into the delay time.

5. The delay measurement system according to claim 3, comprising, as the relay nodes, a first relay node and a second relay node located at a position on the network which is nearer to the transmission destination node than the first relay node, wherein
the transmission destination node calculates the delay between the first and second relay nodes from a difference between a first delay time measured in the first relay node and a second delay time measured in the second relay node.

6. A delay measurement method performed by a system including a network including a transmission source node, a transmission destination node connected to the transmission source node through relay nodes, and the relay nodes that relay communication from the transmission source node to the transmission destination node, comprising steps of:
generating a clock by the transmission source node;
generating a delay measurement packet by the transmission source node at a regular interval based on the generated clock;
transmitting the generated delay measurement packet to the transmission destination node by the transmission source node;
selecting the delay measurement packet from a reception frame by each of the relay nodes;
calculating a delay time of the delay measurement packet transmitted from the transmission source node to the relay node itself in the network by each of the relay nodes;
storing the calculated delay time and a node identifier of the relay node itself in the delay measurement packet to correct the delay measurement packet by each of the relay nodes;
transmitting the corrected delay measurement packet toward the transmission destination node by each of the relay nodes;
selecting the delay measurement packet from a reception frame by the transmission destination node;
measuring, by the transmission destination node, a delay with which the delay measurement packet is transmitted from the transmission source node to the transmission destination node itself in the network; and
calculating, based on the delay time and node identifier stored in the delay measurement packet, any one or a combination of the delay time between the transmission source node and transmission destination node, delay time between the transmission source node and relay node, delay time between the relay nodes, and delay time between the relay node and transmission destination node by the transmission destination node.

7. The delay measurement method according to claim 6, wherein:
the relay nodes each generates a clock;
the relay nodes each prepares a packet counter that increases a counter value for each reception of the delay measurement packet and decreases the counter value according to the clock generated by the relay node to manage an arrival state and an output state of the delay measurement packet as the counter value;
the relay nodes each stores, in the delay measurement packet, a counter value of the delay measurement packet at time of arrival and the node identifier of the relay node itself; and
the transmission destination node calculates, based on packet counter value information stored in the delay measurement packet, counter values between the transmission source node and relay node, between the relay nodes, and between the relay node and transmission destination node and converts each of the calculated counter values into the delay time.

8. The delay measurement method according to claim 6, wherein:
the system includes, as the relay nodes, a first relay node and a second relay node located at a position on the network which is nearer to the transmission destination node than the first relay node; and the transmission destination node calculates the delay between the first and second relay nodes from a difference between a first delay time measured in the first relay node and a second delay time measured in the second relay node.

9. A delay measurement device that serves as a transmission destination node connected to a transmission source node over a network including a relay node and measures a delay time between the transmission source node and the transmission destination node, said delay measurement device comprising:

an interface that receives a delay measurement packet generated at a regular interval based on a source clock generated by the transmission source node;

a control packet analysis section that selects the delay measurement packet from a reception frame;

a delay measurement section that measures a delay with which the delay measurement packet is transmitted over the network from the transmission source node to the transmission destination node itself; and a destination clock generation section that generates another clock, wherein the delay measurement section of the delay measurement device includes:

a packet counter that increases a counter value for each reception of the delay measurement packet and decreases the counter value according to the another clock of the destination clock generation section to manage an arrival state and an output state of the delay measurement packet as the counter value; and a delay calculation section that monitors the counter value managed by the packet counter to calculate a queuing delay added, in the network, to the delay measurement packet transmitted from the transmission source node.

10. The delay measurement device according to claim 9, wherein the delay measurement section of the delay measurement device further includes:

a counter maximum value monitor section that monitors the counter value managed by the packet counter for a predetermined measurement time period to detect a counter value at time of arrival of a packet with zero queuing delay from the transmitted delay measurement packets and sets the detected counter value as a reference value; and an on-arrival counter value monitor section that monitors a counter value at time of arrival of the delay measurement packet, and the delay calculation section calculates the queuing delay from a difference between the reference value and the counter value monitored by the on-arrival counter value monitor section.

11. A delay measurement method performed by a system including a transmission source node and a transmission destination node connected to the transmission source node over a network including a relay node to measure a delay time in a direction from the transmission source node to the transmission destination node, said delay measurement method comprising the steps of:

generating a clock by the transmission source node;

generating a delay measurement packet at a regular interval by the transmission source node based on the generated clock;

transmitting the generated delay measurement packet to the transmission destination node by the transmission source node;

selecting the delay measurement packet from a reception frame by the transmission destination node; and measuring, by the transmission destination node, a delay with which the delay measurement packet is transmitted from the transmission source node to the transmission destination node itself in the network;

generating another clock by the transmission destination mode;

preparing a packet counter that increases a counter value for each reception of the delay measurement packet and decreases the counter value according to the another clock generated by the transmission destination node to manage an arrival state and an output state of the delay measurement packet as the counter value by the transmission destination node; and monitoring the counter value managed by the packet counter to calculate a queuing delay added, in the network, to the delay measurement packet transmitted from the transmission source node by the transmission destination node.

12. The delay measurement method according to claim 11, wherein:

the transmission destination node monitors the counter value managed by the packet counter for a predetermined measurement time period to detect a counter value at time of arrival of a packet with zero queuing delay from the transmitted delay measurement packets and setting the detected counter value as a reference value;

the transmission destination node monitors a counter value at time of arrival of the delay measurement packet; and the transmission destination node calculates the queuing delay from a difference between the reference value and the monitored counter value.

13. A non-transitory computer-readable recording medium which enables a computer to function as a delay measurement device that serves as a transmission destination node connected to a transmission source node over a network including a relay node, and measures a delay time between the transmission source node and the transmission destination node, said delay measurement device comprising:

an interface that receives a delay measurement packet generated at a regular interval based on a source clock generated by the transmission source node;

a control packet analysis section that selects the delay measurement packet from a reception frame;

a delay measurement section that measures a delay with which the delay measurement packet is transmitted over the network from the transmission source node to the transmission destination node itself; and a destination clock generation section that generates another clock, wherein the delay measurement section of the delay measurement device includes:

a packet counter that increases a counter value for each reception of the delay measurement packet and decreases the counter value according to the clock of the destination clock generation section to manage an arrival state and an output state of the delay measurement packet as the counter value; and a delay calculation section that monitors the counter value managed by the packet counter to calculate a queuing delay added, in the network, to the delay measurement packet transmitted from the transmission source node.

14. The non-transitory computer-readable recording medium according to claim 13, wherein the delay measurement section of the delay measurement device further includes:

a counter maximum value monitor section that monitors the counter value managed by the packet counter for a predetermined measurement time period to detect a counter value at a time of arrival of a packet with zero queuing delay from the transmitted delay measurement packets and sets the detected counter value as a reference value; and the on-arrival counter value monitor section that monitors a counter value at a time of arrival of the delay measurement packet, and the delay calculation section calculates the queuing delay from a difference between the reference value and the counter value monitored by the on-arrival counter value monitor section.

\* \* \* \* \*